(12) United States Patent
Abhyanker

(10) Patent No.: US 9,441,981 B2
(45) Date of Patent: Sep. 13, 2016

(54) VARIABLE BUS STOPS ACROSS A BUS ROUTE IN A REGIONAL TRANSPORTATION NETWORK

(71) Applicant: Raj Abhyanker, Cupertino, CA (US)

(72) Inventor: Raj Abhyanker, Cupertino, CA (US)

(73) Assignee: FATDOOR, INC., Mountain View, CA (US)

( * ) Notice: Subject to any disclaimer, the term of this patent is extended or adjusted under 35 U.S.C. 154(b) by 140 days.

(21) Appl. No.: 14/309,912

(22) Filed: Jun. 20, 2014

(65) Prior Publication Data

US 2015/0369621 A1 Dec. 24, 2015

(51) Int. Cl.
*G01C 21/36* (2006.01)
*H04W 4/02* (2009.01)
*G06Q 50/32* (2012.01)

(52) U.S. Cl.
CPC ............. *G01C 21/36* (2013.01); *G06Q 50/32* (2013.01); *H04W 4/02* (2013.01)

(58) Field of Classification Search
CPC .............. G01C 21/34; G01C 21/3407; G01C 21/3423; G01C 21/343; G01C 21/3438; G01C 21/3605; G01C 21/362; G01C 21/3664; H04W 4/02; H04W 4/021; H04W 4/023; H04W 4/025; H04W 4/04; H04W 4/046; G06Q 50/30; G08G 1/20; G08G 1/202; G05D 1/0088
USPC .......................... 701/13, 6; 705/410, 533, 538
See application file for complete search history.

(56) References Cited

U.S. PATENT DOCUMENTS

| 2,035,218 A | 3/1936 | Bloom |
| 3,253,806 A | 5/1966 | Eickmann |
| 3,556,438 A | 1/1971 | Meditz |

(Continued)

FOREIGN PATENT DOCUMENTS

| EP | 1426876 A1 | 6/2004 |
| KR | 101069834 B1 | 10/2010 |

(Continued)

OTHER PUBLICATIONS

"Crowdsourcing: Those that are willing to test & learn will be those that will win", Newsline, Mar. 1, 2011 by Neil Perkin http://mediatel.co.uk/newsline/2011/03/01/crowdsourcing-those-that-are-willing-to-test-learn-will-be-those-that-will-win/.

(Continued)

*Primary Examiner* — Thomas G Black
*Assistant Examiner* — Sara Lewandroski
(74) *Attorney, Agent, or Firm* — Raj Abhyanker, P.C.

(57) ABSTRACT

Disclosed are a method and a system of variable bus stops across a bus route in a regional transportation network, according to one embodiment. A method of a bus server includes analyzing a current geospatial location of a mobile device responsive to a pick up request of a prospective bus passenger, associating a closest street intersection with the current geospatial location of the mobile device, and determining if a bus route traverses the closest street intersection associated with the current geospatial location of the mobile device. A message may be communicated to the mobile device based on the determination of whether the bus route traverses the closest street intersection. A bus associated with the bus route may be instructed to pick up the prospective bus passenger when the bus route traverses the closest street intersection associated with the current geospatial location of the mobile device.

17 Claims, 9 Drawing Sheets

(56) References Cited

U.S. PATENT DOCUMENTS

| | | |
|---|---|---|
| 3,762,669 A | 10/1973 | Curci |
| 4,119,163 A | 10/1978 | Ball |
| 4,161,843 A | 7/1979 | Hui |
| 4,375,354 A | 3/1983 | Henriksson |
| 4,556,198 A | 12/1985 | Tominaga |
| 4,779,203 A | 10/1988 | McClure et al. |
| 4,914,605 A | 4/1990 | Loughmiller, Jr. et al. |
| 4,996,468 A | 2/1991 | Field et al. |
| 5,050,844 A | 9/1991 | Hawk |
| 5,199,686 A | 4/1993 | Fletcher |
| 5,208,750 A | 5/1993 | Kurami et al. |
| 5,325,294 A | 6/1994 | Keene |
| 5,372,211 A | 12/1994 | Wilcox et al. |
| 5,521,817 A | 5/1996 | Burdoin et al. |
| 5,577,567 A | 11/1996 | Johnson et al. |
| 5,581,630 A | 12/1996 | Bonneau, Jr. |
| 5,590,062 A | 12/1996 | Nagamitsu et al. |
| 5,617,319 A | 4/1997 | Arakawa et al. |
| 5,630,103 A | 5/1997 | Smith et al. |
| 5,671,342 A | 9/1997 | Millier et al. |
| 5,720,363 A | 2/1998 | Kipp |
| 5,751,245 A | 5/1998 | Janky et al. |
| 5,774,133 A | 6/1998 | Neave et al. |
| 5,794,207 A | 8/1998 | Walker et al. |
| 5,799,263 A | 8/1998 | Culbertson |
| 5,805,810 A | 9/1998 | Maxwell |
| 5,819,269 A | 10/1998 | Uomini |
| 5,826,244 A | 10/1998 | Huberman |
| 5,831,664 A | 11/1998 | Wharton et al. |
| 5,835,896 A | 11/1998 | Fisher et al. |
| 5,852,810 A | 12/1998 | Sotiroff et al. |
| 5,904,214 A | 5/1999 | Lin |
| 5,905,499 A | 5/1999 | McDowall et al. |
| 5,907,322 A | 5/1999 | Kelly et al. |
| 5,926,765 A | 7/1999 | Sasaki |
| 5,930,474 A | 7/1999 | Dunworth et al. |
| 5,937,413 A | 8/1999 | Hyun et al. |
| 5,940,806 A | 8/1999 | Danial |
| 5,991,737 A | 11/1999 | Chen |
| 6,024,288 A | 2/2000 | Gottlich et al. |
| 6,029,141 A | 2/2000 | Bezos et al. |
| 6,029,195 A | 2/2000 | Herz |
| 6,034,618 A | 3/2000 | Tatebayashi et al. |
| 6,036,601 A | 3/2000 | Heckel |
| 6,047,194 A | 4/2000 | Andersson |
| 6,047,236 A | 4/2000 | Hancock et al. |
| 6,049,778 A | 4/2000 | Walker et al. |
| 6,059,263 A | 5/2000 | Otema et al. |
| 6,073,138 A | 6/2000 | de l'Etraz et al. |
| 6,078,906 A | 6/2000 | Huberman |
| 6,088,702 A | 7/2000 | Plantz et al. |
| 6,092,076 A | 7/2000 | McDonough et al. |
| 6,092,105 A | 7/2000 | Goldman |
| 6,101,484 A | 8/2000 | Halbert et al. |
| 6,108,639 A | 8/2000 | Walker et al. |
| 6,122,592 A | 9/2000 | Arakawa et al. |
| 6,134,486 A | 10/2000 | Kanayama |
| 6,148,260 A | 11/2000 | Musk et al. |
| 6,148,289 A | 11/2000 | Virdy |
| 6,175,831 B1 | 1/2001 | Weinreich et al. |
| 6,199,076 B1 | 3/2001 | Logan et al. |
| 6,229,533 B1 | 5/2001 | Farmer et al. |
| 6,236,990 B1 | 5/2001 | Geller et al. |
| 6,269,369 B1 | 7/2001 | Robertson |
| 6,308,177 B1 | 10/2001 | Israni et al. |
| 6,317,718 B1 | 11/2001 | Fano |
| 6,336,111 B1 | 1/2002 | Ashby et al. |
| 6,339,745 B1 | 1/2002 | Novik |
| 6,356,834 B2 | 3/2002 | Hancock et al. |
| 6,381,537 B1 | 4/2002 | Chenault et al. |
| 6,401,085 B1 | 6/2002 | Gershman et al. |
| 6,405,123 B1 | 6/2002 | Rennard et al. |
| 6,408,307 B1 | 6/2002 | Semple et al. |
| 6,445,983 B1 | 9/2002 | Dickson et al. |
| 6,453,339 B1 | 9/2002 | Schultz et al. |
| 6,470,268 B1 | 10/2002 | Ashcraft et al. |
| 6,480,885 B1 | 11/2002 | Olivier |
| 6,487,583 B1 | 11/2002 | Harvey et al. |
| 6,498,982 B2 | 12/2002 | Bellesfield et al. |
| 6,507,776 B1 | 1/2003 | Fox, III |
| 6,513,069 B1 | 1/2003 | Abato et al. |
| 6,519,629 B2 | 2/2003 | Harvey et al. |
| 6,532,007 B1 | 3/2003 | Matsuda |
| 6,542,813 B1 | 4/2003 | Kovacs |
| 6,542,817 B2 | 4/2003 | Miyaki |
| 6,542,936 B1 | 4/2003 | Mayle et al. |
| 6,557,013 B1 | 4/2003 | Ziff et al. |
| 6,587,787 B1 | 7/2003 | Yokota |
| 6,600,418 B2 | 7/2003 | Francis et al. |
| 6,611,751 B2 | 8/2003 | Warren |
| 6,615,039 B1 | 9/2003 | Eldering |
| 6,622,086 B2 | 9/2003 | Polidi |
| 6,633,311 B1 | 10/2003 | Douvikas et al. |
| 6,636,803 B1 | 10/2003 | Hartz, Jr. et al. |
| 6,640,187 B1 | 10/2003 | Chenault et al. |
| 6,643,663 B1 | 11/2003 | Dabney et al. |
| 6,646,568 B2 | 11/2003 | MacPhail et al. |
| 6,647,383 B1 | 11/2003 | August et al. |
| 6,658,410 B1 | 12/2003 | Sakamaki et al. |
| 6,662,016 B1 | 12/2003 | Buckham et al. |
| 6,672,601 B1 | 1/2004 | Hofheins et al. |
| 6,677,894 B2 | 1/2004 | Sheynblat et al. |
| 6,687,878 B1 | 2/2004 | Eintracht et al. |
| 6,691,105 B1 | 2/2004 | Virdy |
| 6,691,114 B1 | 2/2004 | Nakamura |
| 6,711,414 B1 | 3/2004 | Lightman et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,728,635 B2 | 4/2004 | Hamada et al. |
| 6,745,196 B1 | 6/2004 | Colyer et al. |
| 6,750,881 B1 | 6/2004 | Appelman |
| 6,798,407 B1 | 9/2004 | Benman |
| 6,816,850 B2 | 11/2004 | Culliss |
| 6,819,267 B1 | 11/2004 | Edmark et al. |
| 6,834,229 B2 | 12/2004 | Rafiah et al. |
| 6,847,823 B2 | 1/2005 | Lehikoinen et al. |
| 6,871,140 B1 | 3/2005 | Florance et al. |
| 6,882,307 B1 | 4/2005 | Gifford |
| 6,883,748 B2 | 4/2005 | Yoeli |
| 6,889,213 B1 | 5/2005 | Douvikas et al. |
| 6,907,405 B2 | 6/2005 | Brett |
| 6,918,576 B2 | 7/2005 | Finkbeiner |
| 6,926,233 B1 | 8/2005 | Corcoran, III |
| 6,931,419 B1 | 8/2005 | Lindquist |
| 6,950,791 B1 | 9/2005 | Bray et al. |
| 6,963,879 B2 | 11/2005 | Colver et al. |
| 6,968,179 B1 | 11/2005 | De Vries |
| 6,968,513 B1 | 11/2005 | Rinebold et al. |
| 6,974,123 B2 | 12/2005 | Latvys |
| 6,976,031 B1 | 12/2005 | Toupal et al. |
| 6,978,284 B2 | 12/2005 | McBrearty et al. |
| 6,983,139 B2 | 1/2006 | Dowling et al. |
| 6,987,976 B2 | 1/2006 | Kohar et al. |
| 7,006,881 B1 | 2/2006 | Hoffberg et al. |
| 7,013,292 B1 | 3/2006 | Hsu et al. |
| 7,024,397 B1 | 4/2006 | Donahue |
| 7,024,455 B2 | 4/2006 | Yokobori et al. |
| 7,038,681 B2 | 5/2006 | Scott et al. |
| 7,047,202 B2 | 5/2006 | Jaipuria et al. |
| 7,050,909 B2 | 5/2006 | Nichols et al. |
| 7,068,309 B2 | 6/2006 | Toyama et al. |
| 7,069,308 B2 | 6/2006 | Abrams |
| 7,072,849 B1 | 7/2006 | Filepp et al. |
| 7,079,943 B2 | 7/2006 | Flann et al. |
| 7,080,019 B1 | 7/2006 | Hurzeler |
| 7,080,096 B1 | 7/2006 | Imamura |
| 7,099,745 B2 | 8/2006 | Ebert |
| 7,099,862 B2 | 8/2006 | Fitzpatrick et al. |
| 7,117,254 B2 | 10/2006 | Lunt et al. |
| 7,130,702 B2 | 10/2006 | Morrell |
| 7,136,915 B2 | 11/2006 | Rieger, III |
| 7,155,336 B2 | 12/2006 | Dorfman et al. |
| 7,158,878 B2 | 1/2007 | Rasmussen et al. |

(56) References Cited

U.S. PATENT DOCUMENTS

| | | |
|---|---|---|
| 7,177,872 B2 | 2/2007 | Schwesig et al. |
| 7,178,720 B1 | 2/2007 | Strubbe et al. |
| 7,184,990 B2 | 2/2007 | Walker et al. |
| 7,188,056 B2 | 3/2007 | Kagarlis |
| 7,188,080 B1 | 3/2007 | Walker et al. |
| 7,188,153 B2 | 3/2007 | Lunt et al. |
| 7,209,803 B2 | 4/2007 | Okamoto et al. |
| 7,218,993 B2 | 5/2007 | Yasukawa et al. |
| 7,228,232 B2 | 6/2007 | Bodin et al. |
| 7,233,942 B2 | 6/2007 | Nye |
| 7,249,123 B2 | 7/2007 | Elder et al. |
| 7,249,732 B2 | 7/2007 | Sanders, Jr. et al. |
| 7,251,647 B2 | 7/2007 | Hoblit |
| 7,254,559 B2 | 8/2007 | Florance et al. |
| 7,269,590 B2 | 9/2007 | Hull et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,343,564 B2 | 3/2008 | Othmer |
| 7,353,034 B2 | 4/2008 | Haney |
| 7,353,114 B1 | 4/2008 | Rohlf et al. |
| 7,353,199 B1 | 4/2008 | DiStefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,375,618 B2 | 5/2008 | Quintos |
| 7,383,251 B2 | 6/2008 | Might |
| 7,386,542 B2 | 6/2008 | Maybury et al. |
| 7,389,210 B2 | 6/2008 | Kagarlis |
| 7,424,438 B2 | 9/2008 | Vianello |
| 7,424,541 B2 | 9/2008 | Bourne |
| 7,426,970 B2 | 9/2008 | Olsen |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,444,241 B2 | 10/2008 | Grimm |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,475,953 B2 | 1/2009 | Osborn et al. |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,505,929 B2 | 3/2009 | Angert et al. |
| 7,520,466 B2 | 4/2009 | Bostan |
| 7,525,276 B2 | 4/2009 | Eaton |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 | 9/2009 | Olson et al. |
| 7,587,276 B2 | 9/2009 | Gold et al. |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,617,048 B2 | 11/2009 | Simon et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,953 B2 | 4/2010 | Middleton et al. |
| 7,702,545 B1 | 4/2010 | Compton et al. |
| 7,725,492 B2 | 5/2010 | Sittig et al. |
| 7,734,254 B2 | 6/2010 | Frost et al. |
| 7,761,789 B2 | 7/2010 | Erol et al. |
| 7,792,815 B2 | 9/2010 | Aravamudan et al. |
| 7,797,256 B2 | 9/2010 | Zuckerberg et al. |
| 7,801,542 B1 | 9/2010 | Stewart |
| 7,802,290 B1 | 9/2010 | Bansal et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,319 B2 | 11/2010 | Zhong |
| 7,840,558 B2 | 11/2010 | Wiseman et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 | 1/2011 | Gieseke |
| 7,881,864 B2 | 2/2011 | Smith |
| 7,886,024 B2 | 2/2011 | Kelly et al. |
| 7,894,933 B2 | 2/2011 | Mountz et al. |
| 7,894,939 B2 | 2/2011 | Zini et al. |
| 7,894,981 B2 | 2/2011 | Yamane et al. |
| 7,904,366 B2 | 3/2011 | Pogust |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 | 7/2011 | Chilson et al. |
| 7,991,703 B1 | 8/2011 | Watkins |
| 7,996,109 B2 | 8/2011 | Zini et al. |
| 8,010,230 B2 | 8/2011 | Zini et al. |
| 8,027,943 B2 | 9/2011 | Juan et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,103,734 B2 | 1/2012 | Galli et al. |
| 8,107,879 B2 | 1/2012 | Pering et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 | 3/2012 | Weber et al. |
| 8,145,703 B2 | 3/2012 | Frishert et al. |
| 8,149,113 B2 | 4/2012 | Diem |
| 8,167,234 B1 | 5/2012 | Moore |
| 8,171,128 B2 | 5/2012 | Zuckerberg et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,624 B2 | 6/2012 | Zini et al. |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,743 B2 | 10/2012 | Curran et al. |
| 8,315,389 B2 | 11/2012 | Qiu et al. |
| 8,326,091 B1 | 12/2012 | Jing et al. |
| 8,326,315 B2 | 12/2012 | Phillips et al. |

(56) References Cited

U.S. PATENT DOCUMENTS

| | | |
|---|---|---|
| 8,328,130 B2 | 12/2012 | Goossen |
| 8,352,183 B2 | 1/2013 | Thota et al. |
| 8,364,757 B2 | 1/2013 | Scott et al. |
| 8,370,003 B2 | 2/2013 | So et al. |
| 8,380,382 B2 | 2/2013 | Sung et al. |
| 8,380,638 B1 | 2/2013 | Watkins |
| 8,391,789 B2 | 3/2013 | Palin et al. |
| 8,391,909 B2 | 3/2013 | Stewart |
| 8,401,771 B2 | 3/2013 | Krumm et al. |
| 8,402,094 B2 | 3/2013 | Bosworth et al. |
| 8,402,372 B2 | 3/2013 | Gillespie et al. |
| 8,412,576 B2 | 4/2013 | Urbanski |
| 8,412,675 B2 | 4/2013 | Alvarado et al. |
| 8,427,308 B1 | 4/2013 | Baron, Sr. et al. |
| 8,428,565 B2 | 4/2013 | Middleton et al. |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,764 B2 | 6/2013 | Fujioka et al. |
| 8,473,199 B2 | 6/2013 | Blumberg et al. |
| 8,493,849 B2 | 7/2013 | Fuste Vilella et al. |
| 8,498,947 B1 * | 7/2013 | Haake .................. G06Q 10/047 705/338 |
| 8,504,284 B2 | 8/2013 | Brülle-Drews et al. |
| 8,504,512 B2 | 8/2013 | Herzog et al. |
| 8,510,268 B1 | 8/2013 | Laforge et al. |
| 8,521,656 B2 | 8/2013 | Zimberoff et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,600,602 B1 | 12/2013 | McAndrew et al. |
| 8,615,565 B2 | 12/2013 | Randall |
| 8,620,532 B2 | 12/2013 | Curtis et al. |
| 8,620,827 B1 | 12/2013 | Watkins, III |
| 8,626,699 B2 | 1/2014 | Xie et al. |
| 8,627,506 B2 | 1/2014 | Vera et al. |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |
| 8,666,660 B2 | 3/2014 | Sartipi et al. |
| 8,671,095 B2 | 3/2014 | Gross |
| 8,671,106 B1 | 3/2014 | Lee et al. |
| 8,688,594 B2 | 4/2014 | Thomas et al. |
| 8,694,605 B1 | 4/2014 | Burrell et al. |
| 8,695,919 B2 | 4/2014 | Shachor et al. |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Guéziec |
| 8,723,679 B2 | 5/2014 | Whisenant |
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,738,292 B1 * | 5/2014 | Faaborg .................. G01C 21/26 701/117 |
| 8,775,405 B2 | 7/2014 | Gross |
| D710,454 S | 8/2014 | Barajas et al. |
| 8,794,566 B2 | 8/2014 | Hutson |
| 8,799,253 B2 | 8/2014 | Valliani et al. |
| 8,825,226 B1 | 9/2014 | Worley, III et al. |
| 8,832,556 B2 | 9/2014 | Steinberg |
| 2001/0016795 A1 | 8/2001 | Bellinger |
| 2001/0020955 A1 | 9/2001 | Nakagawa et al. |
| 2001/0029426 A1 | 10/2001 | Hancock et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1 | 12/2002 | McCall et al. |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1 | 1/2003 | Knorr |
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1 | 10/2003 | Bell et al. |
| 2003/0218253 A1 | 11/2003 | Avanzino et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0054428 A1 | 3/2004 | Sheha et al. |
| 2004/0056762 A1 | 3/2004 | Rogers |
| 2004/0088177 A1 | 5/2004 | Travis et al. |

(56) References Cited

U.S. PATENT DOCUMENTS

| | | |
|---|---|---|
| 2004/0109012 A1 | 6/2004 | Kraus et al. |
| 2004/0111302 A1 | 6/2004 | Falk et al. |
| 2004/0122570 A1 | 6/2004 | Sonoyama et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield |
| 2004/0260677 A1 | 12/2004 | Malpani et al. |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1 | 5/2005 | Bodin et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1 | 9/2005 | Ogino et al. |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0025883 A1 | 2/2006 | Reeves |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0058921 A1 | 3/2006 | Okamoto |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |
| 2006/0100892 A1 | 5/2006 | Ellanti |
| 2006/0113425 A1 | 6/2006 | Rader |
| 2006/0123053 A1 | 6/2006 | Scannell |
| 2006/0125616 A1 | 6/2006 | Song |
| 2006/0136127 A1 | 6/2006 | Coch et al. |
| 2006/0136419 A1 | 6/2006 | Brydon et al. |
| 2006/0143066 A1 | 6/2006 | Calabria |
| 2006/0143067 A1 | 6/2006 | Calabria |
| 2006/0143083 A1 | 6/2006 | Wedeen |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0212407 A1 | 9/2006 | Lyon |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1 | 10/2006 | Haney |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |

(56) References Cited

U.S. PATENT DOCUMENTS

| | | |
|---|---|---|
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0078747 A1 | 4/2007 | Baack |
| 2007/0078772 A1 | 4/2007 | Dadd |
| 2007/0099609 A1 | 5/2007 | Cai |
| 2007/0105536 A1 | 5/2007 | Tingo |
| 2007/0106627 A1 | 5/2007 | Srivastava et al. |
| 2007/0112461 A1 | 5/2007 | Zini et al. |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1 | 7/2007 | Ross |
| 2007/0162942 A1 | 7/2007 | Hamynen et al. |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |
| 2007/0179905 A1 | 8/2007 | Buch et al. |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0203820 A1 | 8/2007 | Rashid |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0218900 A1 | 9/2007 | Abhyanker |
| 2007/0219712 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0268310 A1 | 11/2007 | Dolph et al. |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288311 A1 | 12/2007 | Underhill |
| 2007/0288621 A1 | 12/2007 | Gundu et al. |
| 2007/0294357 A1 | 12/2007 | Antoine |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0010365 A1 | 1/2008 | Schneider |
| 2008/0016051 A1 | 1/2008 | Schiller |
| 2008/0020814 A1 | 1/2008 | Kernene |
| 2008/0027772 A1 | 1/2008 | Gernega et al. |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg |
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065321 A1 | 3/2008 | DaCosta |
| 2008/0065611 A1 | 3/2008 | Hepworth et al. |
| 2008/0070593 A1 | 3/2008 | Altman et al. |
| 2008/0070697 A1 | 3/2008 | Robinson et al. |
| 2008/0071929 A1 | 3/2008 | Motte et al. |
| 2008/0077464 A1 | 3/2008 | Gottlieb et al. |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0091786 A1 | 4/2008 | Jhanji |
| 2008/0097999 A1 | 4/2008 | Horan |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0125969 A1 | 5/2008 | Chen et al. |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington |
| 2008/0134035 A1 | 6/2008 | Pennington et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162027 A1 | 7/2008 | Murphy et al. |
| 2008/0162211 A1 | 7/2008 | Addington |
| 2008/0162260 A1 | 7/2008 | Rohan et al. |

(56) References Cited

U.S. PATENT DOCUMENTS

| | | |
|---|---|---|
| 2008/0167771 A1 | 7/2008 | Whittaker et al. |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195428 A1* | 8/2008 | O'Sullivan ............ G06Q 10/00 705/6 |
| 2008/0195483 A1 | 8/2008 | Moore |
| 2008/0208956 A1 | 8/2008 | Spiridellis et al. |
| 2008/0215994 A1 | 9/2008 | Harrison et al. |
| 2008/0221846 A1 | 9/2008 | Aggarwal et al. |
| 2008/0222140 A1 | 9/2008 | Lagad et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0243378 A1 | 10/2008 | Zavoli |
| 2008/0243667 A1 | 10/2008 | Lecomte |
| 2008/0243830 A1 | 10/2008 | Abhyanker |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269992 A1 | 10/2008 | Kawasaki |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0063500 A1 | 3/2009 | Zhai et al. |
| 2009/0064011 A1 | 3/2009 | Abhyanker |
| 2009/0064144 A1 | 3/2009 | Abhyanker |
| 2009/0069034 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0119275 A1 | 5/2009 | Chen et al. |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0284530 A1 | 11/2009 | Lester et al. |
| 2009/0287682 A1 | 11/2009 | Fujioka et al. |
| 2009/0299551 A1 | 12/2009 | So et al. |
| 2010/0011081 A1 | 1/2010 | Crowley et al. |
| 2010/0017275 A1* | 1/2010 | Carlson ................. G06Q 20/32 705/13 |
| 2010/0023388 A1 | 1/2010 | Blumberg et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0064007 A1 | 3/2010 | Randall |
| 2010/0070075 A1 | 3/2010 | Chirnomas |
| 2010/0076966 A1 | 3/2010 | Strutton et al. |
| 2010/0077316 A1 | 3/2010 | Omansky et al. |
| 2010/0079338 A1 | 4/2010 | Wooden et al. |
| 2010/0082683 A1 | 4/2010 | Law et al. |
| 2010/0083125 A1 | 4/2010 | Zafar et al. |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |
| 2010/0118025 A1 | 5/2010 | Smith et al. |
| 2010/0120422 A1 | 5/2010 | Cheung et al. |
| 2010/0138259 A1 | 6/2010 | Delk |
| 2010/0138318 A1 | 6/2010 | Chun |
| 2010/0153279 A1* | 6/2010 | Zahn ..................... G06Q 10/02 705/80 |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0231383 A1 | 9/2010 | Levine et al. |
| 2010/0243794 A1 | 9/2010 | Jermyn |
| 2010/0255899 A1 | 10/2010 | Paulsen |
| 2010/0265034 A1* | 10/2010 | Cap ....................... B60R 25/245 340/5.71 |
| 2010/0275033 A1 | 10/2010 | Gillespie et al. |
| 2010/0299177 A1 | 11/2010 | Buczkowski et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0112976 A1 | 5/2011 | Ryan et al. |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0163160 A1 | 7/2011 | Zini et al. |
| 2011/0174920 A1 | 7/2011 | Yoeli |
| 2011/0181470 A1 | 7/2011 | Qiu et al. |
| 2011/0184773 A1* | 7/2011 | Forstall ................. G06Q 50/30 705/7.25 |
| 2011/0202426 A1 | 8/2011 | Cretney et al. |
| 2011/0219318 A1 | 9/2011 | Abhyanker |
| 2011/0231268 A1 | 9/2011 | Ungos |

(56) References Cited

U.S. PATENT DOCUMENTS

| | | |
|---|---|---|
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Guéziec |
| 2012/0126974 A1 | 5/2012 | Phillips et al. |
| 2012/0138732 A1 | 6/2012 | Olm et al. |
| 2012/0166935 A1 | 6/2012 | Abhyanker |
| 2012/0191606 A1 | 7/2012 | Milne |
| 2012/0191797 A1 | 7/2012 | Masonis et al. |
| 2012/0209775 A1 | 8/2012 | Milne |
| 2012/0221470 A1 | 8/2012 | Lyon |
| 2012/0224076 A1 | 9/2012 | Niedermeyer et al. |
| 2012/0232958 A1 | 9/2012 | Silbert |
| 2012/0239483 A1 | 9/2012 | Yankovich et al. |
| 2012/0239520 A1 | 9/2012 | Lee |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0331002 A1 | 12/2012 | Carrington |
| 2013/0024108 A1 | 1/2013 | Grün |
| 2013/0024114 A1* | 1/2013 | Oriet .............. G01C 21/343 701/491 |
| 2013/0041761 A1 | 2/2013 | Voda |
| 2013/0041862 A1 | 2/2013 | Yang et al. |
| 2013/0054317 A1 | 2/2013 | Abhyanker |
| 2013/0055163 A1 | 2/2013 | Matas et al. |
| 2013/0068876 A1 | 3/2013 | Radu |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0103437 A1 | 4/2013 | Nelson |
| 2013/0105635 A1 | 5/2013 | Alzu'bi et al. |
| 2013/0110396 A1* | 5/2013 | Choudhury ........ G01C 21/3438 701/468 |
| 2013/0110631 A1 | 5/2013 | Mitchell et al. |
| 2013/0129075 A1 | 5/2013 | Whitaker |
| 2013/0151455 A1 | 6/2013 | Odom et al. |
| 2013/0159127 A1 | 6/2013 | Myslinski |
| 2013/0204437 A1 | 8/2013 | Koselka et al. |
| 2013/0218455 A1* | 8/2013 | Clark .............. G06Q 50/28 701/411 |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Fuste Vilella et al. |
| 2013/0303197 A1 | 11/2013 | Chandra et al. |
| 2013/0317999 A1 | 11/2013 | Zimberoff et al. |
| 2013/0334307 A1* | 12/2013 | Kwong .............. G06Q 10/08 235/382 |
| 2014/0032034 A1 | 1/2014 | Raptopoulos et al. |
| 2014/0040079 A1* | 2/2014 | Smirin .............. G06Q 30/0641 705/27.1 |
| 2014/0040179 A1 | 2/2014 | Shai Herzog et al. |
| 2014/0067167 A1 | 3/2014 | Levien et al. |
| 2014/0067491 A1* | 3/2014 | James .............. G06Q 50/30 705/13 |
| 2014/0067704 A1 | 3/2014 | Abhyanker |
| 2014/0074736 A1 | 3/2014 | Carrington |
| 2014/0081450 A1 | 3/2014 | Kuehnrich et al. |
| 2014/0095293 A1 | 4/2014 | Abhyanker |
| 2014/0108540 A1 | 4/2014 | Crawford |
| 2014/0108613 A1 | 4/2014 | Randall |
| 2014/0114866 A1 | 4/2014 | Abhyanker |
| 2014/0115671 A1 | 4/2014 | Abhyanker |
| 2014/0123246 A1 | 5/2014 | Abhyanker |
| 2014/0129302 A1* | 5/2014 | Amin ................ G06Q 30/0641 705/13 |
| 2014/0129951 A1* | 5/2014 | Amin ................ G06Q 50/30 715/738 |
| 2014/0130140 A1 | 5/2014 | Abhyanker |
| 2014/0135039 A1 | 5/2014 | Sartipi et al. |
| 2014/0136328 A1 | 5/2014 | Abhyanker |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1 | 5/2014 | Abhyanker |
| 2014/0149508 A1 | 5/2014 | Middleton et al. |
| 2014/0164126 A1 | 6/2014 | Nicholas et al. |
| 2014/0165091 A1 | 6/2014 | Abhyanker |
| 2014/0172727 A1* | 6/2014 | Abhyanker ........ G06Q 30/0645 705/307 |
| 2014/0204360 A1 | 7/2014 | Dowski, Jr. et al. |
| 2014/0207375 A1* | 7/2014 | Lerenc .............. H04W 4/02 701/527 |
| 2014/0222908 A1 | 8/2014 | Park et al. |
| 2014/0254896 A1 | 9/2014 | Zhou et al. |
| 2014/0277834 A1 | 9/2014 | Levien et al. |
| 2014/0316243 A1 | 10/2014 | Niedermeyer |
| 2014/0365250 A1* | 12/2014 | Ikeda ................ G06Q 50/30 705/5 |
| 2015/0012320 A1* | 1/2015 | Juckett .............. G06Q 50/30 705/7.16 |
| 2015/0142497 A1* | 5/2015 | Osumi .............. G06Q 50/30 705/7.23 |
| 2015/0154810 A1* | 6/2015 | Tew ................. G06Q 50/30 705/7.31 |
| 2015/0161533 A1* | 6/2015 | Kawamoto ......... G06Q 50/30 705/7.12 |
| 2015/0227871 A1* | 8/2015 | Zeile ............... G06Q 10/06311 705/7.13 |
| 2015/0294298 A1* | 10/2015 | Michishita ........ G06Q 30/06 705/13 |
| 2015/0324708 A1* | 11/2015 | Skipp .............. G06Q 10/025 705/5 |
| 2015/0324945 A1* | 11/2015 | Lord ............... G06Q 50/30 705/7.13 |
| 2015/0371157 A1* | 12/2015 | Jaffe ............... G06Q 10/025 705/6 |

FOREIGN PATENT DOCUMENTS

| | | |
|---|---|---|
| KR | 1020120121376 A | 7/2012 |
| WO | 0219236 A1 | 3/2002 |
| WO | 0241115 A2 | 5/2002 |
| WO | 2006020471 A1 | 2/2006 |
| WO | 2007113844 A1 | 10/2007 |
| WO | 2008105766 A1 | 9/2008 |
| WO | 2008108772 A1 | 9/2008 |
| WO | 2008118119 A1 | 10/2008 |
| WO | 2008111929 A3 | 11/2008 |
| WO | 2010103163 A1 | 9/2010 |
| WO | 2014121145 A1 | 8/2014 |

OTHER PUBLICATIONS

Benchmark-Backed Nextdoor Launches As a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-for-neighborhoods/.

Fatdoor Founder Sues Benchmark Capital, Saying It Stole His Idea for Nextdoor, All Things Digital Article, Nov. 11, 2011, by Liz Gannes (7 Pages) http://allthingsd.com/20111111/fatdoor-founder-sues-benchmark-capital-saying-it-stole-his-idea-for-nextdoor/.

Fatdoor CEO Talks About Balancing Security with Community, Wired Magazine, May 31, 2007, by Terrence Russell (2 Pages) http://www.wired.com/2007/05/fatdoor_ceo_tal/.

Fatdoor Launches Social Network for Your Neighborhood, Mashable Article, May 28, 2007, by Kristen Nicole (3 Pages) http://mashable.com/2007/05/28/fatdoor/.

(56) References Cited

OTHER PUBLICATIONS

Screenshots of Nextdoor website and its features—as submitted in Case5:14-cv-02335-BLF on Jul. 15, 2014 (pp. 19) http://www.nextdoor.com/.
Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
Advocacy Strategy for the Age of Connectivity, Netcentric Advocacy: fatdoor.com (alpha), Jun. 23, 2007 (p. 1) http://www.neworkcentricadvocacy.net/2007/06/fatdoorcom-alph.html.
Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.
Frontporchforum. screenshots. Jul. 19, 2006 webarchive.org 1-15 (herein FrontPorch) (pp. 15).
Fatdoor where 2.0 Launch Coverage Report, Jun. 21, 2007, by Sterling Communications (pp. 24).
Screenshot of Fatdoor on Wikipedia, Apr. 12, 2007 (p. 1).
Case No. 5-14-cv-02335-BLF *Complaint Fatdoor v. Nextdoor*, Northern District of California, with Exhibits A, B and C {Part 1 (pp. 258)} and Exhibits D, E, F, G and H {Part 2 (pp. 222)}, Jul. 15, 2014.
Expert Report—Forensics of Jon Berryhill, Report, *Nextdoor v. Abhyanker*, Aug. 8, 2014, by Berryhill Computer forensics Inc. (pp. 23).
Case No. 3:12-cv-05667-EMC Complaint *Nextdoor v. Abhyanker*, Northern District of California, Nov. 5, 2012 (pp. 46).
Expert Report—Patent of Jeffrey G. Sheldon, *Nextdoor v. Abhyanker*, Aug. 8, 2014 (pp. 7).
Exhibits of Expert Report—Patent of Jeffrey G. Sheldon, *Nextdoor v. Abhyanker*, with Attachments A, B, C, D and E (1/2) {Part 1 (pp. 46)} and Attachments E (2/2) and F {Part 2 (pp. 41)}.
Case No. 111-CV-212924 *Abhyanker v. Benchmark Capital Partners L.P.*, Superior Court of California, County of Santa Clara, Nov. 10, 2011 (pp. 78) http://www.scribd.com/doc/72441873/Stamped-COMPLAINT-Abhyanker-v-Benchmark-Capital-Et-Al-FILED-PUBLIC.
Neighbors Stop Diaper and Formula Thief in his Tracks, Nextdoor Blog, Aug. 15, 2014, by Anne Dreshfield (pp. 12) http://blog.nextdoor.com/.
Screenshot of Fatdoor website with its features—Aug. 21, 2014 (pp. 6) http://www.fatdoor.com/.
Screenshot of AirBnB website with its features—Aug. 21, 2014 (pp. 4) http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, Complaint *Fatdoor, Inc. v. IP Analytics LLC and Google Inc.*,Northern District of California, Aug. 25, 2014, (pp. 16).
Screenshot of Meetey on CrunchBase, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on CrunchBase, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry The Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).
Wikipedia entry Google Maps website—Aug. 27, 2014 (p. 18) http://en.wikipedia.org/wiki/Google_Maps.
Screenshot of Facebook website for groups, Aug. 27, 2014, (p. 1) https://www.facebook.com/about/groups.
Facebook Engineers bring Google+ Circles to Facebook, Article on ZDNet by Emil Protalinski, Jul. 3, 2011, (pp. 2) http://www.zdnet.com/blog/facebook/facebook-engineers-bring-google-circles-to-facebook/1885.
Screenshot of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.
"Friends and Neighbors on the Web", 2001 by Lada A. Adamic et al. (pp. 9) http://www.hpl.hp.com/research/idl/papers/web10/fnn2.pdf.
"A social influence model of consumer participation in network- and small-group-based virtual communities", International Journal of Research in Marketing, 2004 by Utpal M, Dholakia et al. (pp. 23) http://www-bcf.usc.edu/~douglast/620/bettina1.pdf.
"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.
"Direct Annotation: A Drag-and-Drop Strategy for Labeling Photos", University of Maryland, 2000 by Ben Shneiderman et al. (pp. 8) http://hcil2.cs.umd.edu/trs/2000-06/2000-06.pdf.
"Notification for Shared Annotation of Digital Documents", Technical Report MSR—TR-2001-87, Sep. 19, 2001 by A. J. Bernheim Brush et al. (pp. 9) http://research.microsoft.com/pubs/69880/tr-2001-87.pdf.
"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.
"Computer Systems and the Design of Organizational Interaction", by Fernando Flores et al. (pp. 20) http://cpe.njit.edu/dlnotes/CIS/CIS735/ComputerSystemsandDesign.pdf.
"ChipIn—the easy way to collect money", Louis' Really Useful Finds, Mar. 12. (p. 1) http://reallyusefulthings.tumblr.com/post/28688782/chipin-the-easy-way-to-collect-money.

\* cited by examiner

| PROSPECTIVE BUS PASSENGER 108 | CURRENT GEO-SPATIAL LOCATION 116 | CLOSEST STREET INTERSECTION 112 | PICK UP LOCATION 302 | ESTIMATED TIME OF ARRIVAL 304 | DROP OFF LOCATION 306 | DISTANCE 308 | BUS FARE 310 |
|---|---|---|---|---|---|---|---|
| BOB JONES | $(X_1, Y_1)$ | $(X_A, Y_A)$ | BROOKLYN BRIDGE, PARK SRTEET | 10 MIN | $3^{RD}$ AND B STREET | 5 MILES | $5 |
| JOE PARKER | $(X_2, Y_2)$ | $(X_A, Y_A)$ | BROOKLYN BRIDGE, PARK STREET | 10 MIN | 1500 W EL CAMINO | 5 MILES | $5 |
| MICHAEL | $(X_3, Y_3)$ | $(X_B, Y_B)$ | MEDDON PARK | 15 MIN | ACME STADIUM | 9 MILES | $7 |

TABLE VIEW 350

FIGURE 3

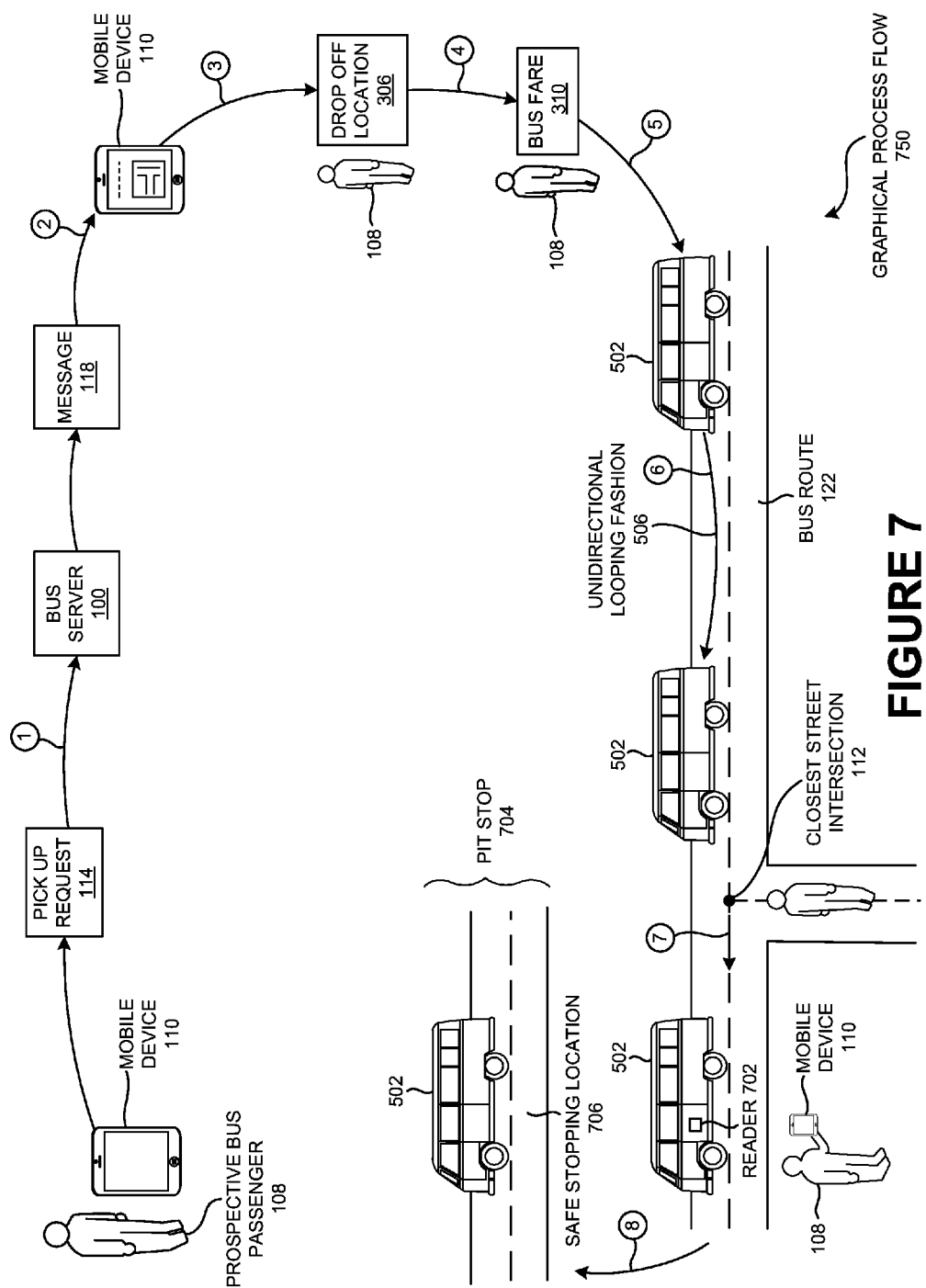

VARIABLE BUS STOPS ACROSS A BUS ROUTE IN A REGIONAL TRANSPORTATION NETWORK

FIELD OF TECHNOLOGY

This disclosure relates generally to the technical fields of communications and, in one example embodiment, to a method, apparatus, and system of variable bus stops across a bus route in a regional transportation network.

BACKGROUND

Individuals may rely on buses in order to accomplish daily tasks (e.g., to get to and/or from work and/or to run errands). Bus stops may not be properly located in order to address changing demands of bus passengers and/or may make it difficult for individuals to effectively use the bus. It may be inefficient for buses and/or bus passengers to use set bus stops along a route as effective pick up locations and/or drop off locations may vary drastically on an hourly, daily, and/or yearly basis.

SUMMARY

A method, device and system of variable bus stops across a bus route in a regional transportation network. In one aspect, a method of a bus server includes analyzing a current geospatial location of a mobile device responsive to a pick up request of a prospective bus passenger, associating a closest street intersection with the current geospatial location of the mobile device, and determining if a bus route traverses the closest street intersection associated with the current geospatial location of the mobile device. A message may be communicated to the mobile device based on the determination of whether the bus route traverses the closest street intersection associated with the current geospatial location of the mobile device.

A bus associated with the bus route may be instructed to pick up the prospective bus passenger at the closest street intersection on the bus route when the bus route traverses the closest street intersection associated with the current geospatial location of the mobile device. An estimated time of arrival of the bus may be communicated to the prospective bus passenger through the message. The bus may only traverse the bus route in a unidirectional looping fashion (such that a particular bus on the bus route for which the closest street intersection is in a forward path of the particular bus is closest is preferred, as compared to other buses on the bus route that have already departed from the closest street intersection in forward journey on the bus route). The particular bus may be an autonomously navigating vehicle and/or a semiautonomously navigating vehicle.

Walking directions may be provided to the prospective bus passenger to the closest street intersection on the bus route. The mobile device may be periodically pinged to provide pickup updates to the prospective bus passenger based on a request of the prospective bus passenger. Multiple ones of the prospective bus passengers in a neighborhood of a current geospatial vicinity of the prospective bus passenger may be routed to a common intersection point that is within a threshold distance from each of the prospective bus passengers of the neighborhood to minimize delays of the particular bus on the bus route. The closest street intersection may be associated with an address that provides for safe navigation of the particular bus on the bus route, such that the particular bus is able to make a pit stop at a safe stopping location when picking up the prospective bus passenger.

A bus fare associated with a route of the bus may be settled directly on the mobile device of the prospective bus passenger prior to the prospective bus passenger boarding the bus. The bus fare may be dependent upon a distance desired to be travelled by the prospective bus passenger. The prospective bus passenger may select a drop off location using the mobile device. The drop off location may be a scheduled bus stop, a custom bus stop, and/or a shared ad-hoc bus stop with other current and prospective bus passengers on the bus route. The prospective bus passenger may pay a premium when the prospective bus passenger selects the custom bus stop on the bus route. The particular bus may be routed to the closest street intersection only when the bus fare is paid on the mobile device. The particular bus may open a door of the bus when the prospective bus passenger swipes the mobile device on a reader of the particular bus when the bus fare has been paid with the mobile device by the prospective bus passenger.

In another aspect, a method of a bus sever includes analyzing a current geospatial location of a mobile device responsive to a pick up request of a prospective bus passenger, associating a closest street intersection with the current geospatial location of the mobile device, and determining if a bus route traverses the closest street intersection associated with the current geospatial location of the mobile device. The method also includes instructing a bus associated with the bus route to pick up the prospective bus passenger at the closest street intersection on the bus route when the bus route traverses the closest street intersection associated with the current geospatial location of the mobile device. A message may be communicated to the mobile device based on the determination of whether the bus route traverses the closest street intersection associated with the current geospatial location of the mobile device.

In yet another aspect, a system includes a mobile device having a current geospatial location, a network, and a bus server. The bus server is configured to analyze the current geospatial location of the mobile device responsive to a pick up request of a prospective bus passenger, associate a closest street intersection with the current geospatial location of the mobile device, determine if a bus route traverses the closest street intersection associated with the current geospatial location of the mobile device, and communicate, through the network, a message to the mobile device based on the determination of whether the bus route traverses the closest street intersection associated with the current geospatial location of the mobile device.

A pick-up algorithm may instruct a bus associated with the bus route to pick up the prospective bus passenger at the closest street intersection on the bus route when the bus route traverses the closest street intersection associated with the current geospatial location of the mobile device. A time-of-arrival algorithm may communicate an estimated time of arrival of the bus to the prospective bus passenger through the message. The bus may only traverse the bus route in a unidirectional looping fashion (such that a particular bus on the bus route for which the closest street intersection is in a forward path of the particular bus is closest is preferred, as compared to other buses on the bus route that have already departed from the closest street intersection in forward journey on the bus route). The particular bus may be an autonomously navigating vehicle, and/or a semiautonomously navigating vehicle.

A direction algorithm may provide walking directions to the prospective bus passenger to the closest street intersection on the bus route. An update algorithm may periodically ping the mobile device to provide pickup updates to the prospective bus passenger based on a request of the prospective bus passenger. A rally algorithm may route multiple ones of the prospective bus passengers in a neighborhood of a current geospatial vicinity of the prospective bus passenger to a common intersection point that is within a threshold distance from each of the prospective bus passengers of the neighborhood to minimize delays of the particular bus on the bus route.

The closest street intersection may be associated with an address that provides for safe navigation of the particular bus on the bus route (such that the particular bus is able to make a pit stop at a safe stopping location when picking up the prospective bus passenger). A payment algorithm may directly settle a bus fare associated with a route of the bus on the mobile device of the prospective bus passenger prior to the prospective bus passenger boarding the bus. The bus fare may be dependent upon a distance desired to be travelled by the prospective bus passenger.

The prospective bus passenger may select a drop off location using the mobile device. The drop off location may be a scheduled bus stop, a custom bus stop, and/or a shared ad-hoc bus stop with other current and prospective bus passengers on the bus route. The prospective bus passenger may pay a premium when the prospective bus passenger selects the custom bus stop on the bus route. The particular bus may be routed to the closest street intersection only when the bus fare is paid on the mobile device. The particular bus may open a door of the bus when the prospective bus passenger swipes the mobile device on a reader of the particular bus when the bus fare has been paid with the mobile device by the prospective bus passenger.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 3 is a table view illustrating data relationships between the prospective bus passenger, the pick-up request, and the message of FIG. 1, according to one embodiment.

FIG. 7 is a graphical process flow of variable bus stops across the bus route in a regional transportation network, according to one embodiment.

Other features of the present embodiments will be apparent from the accompanying drawings and from the detailed description that follows.

DETAILED DESCRIPTION

Figure 1:
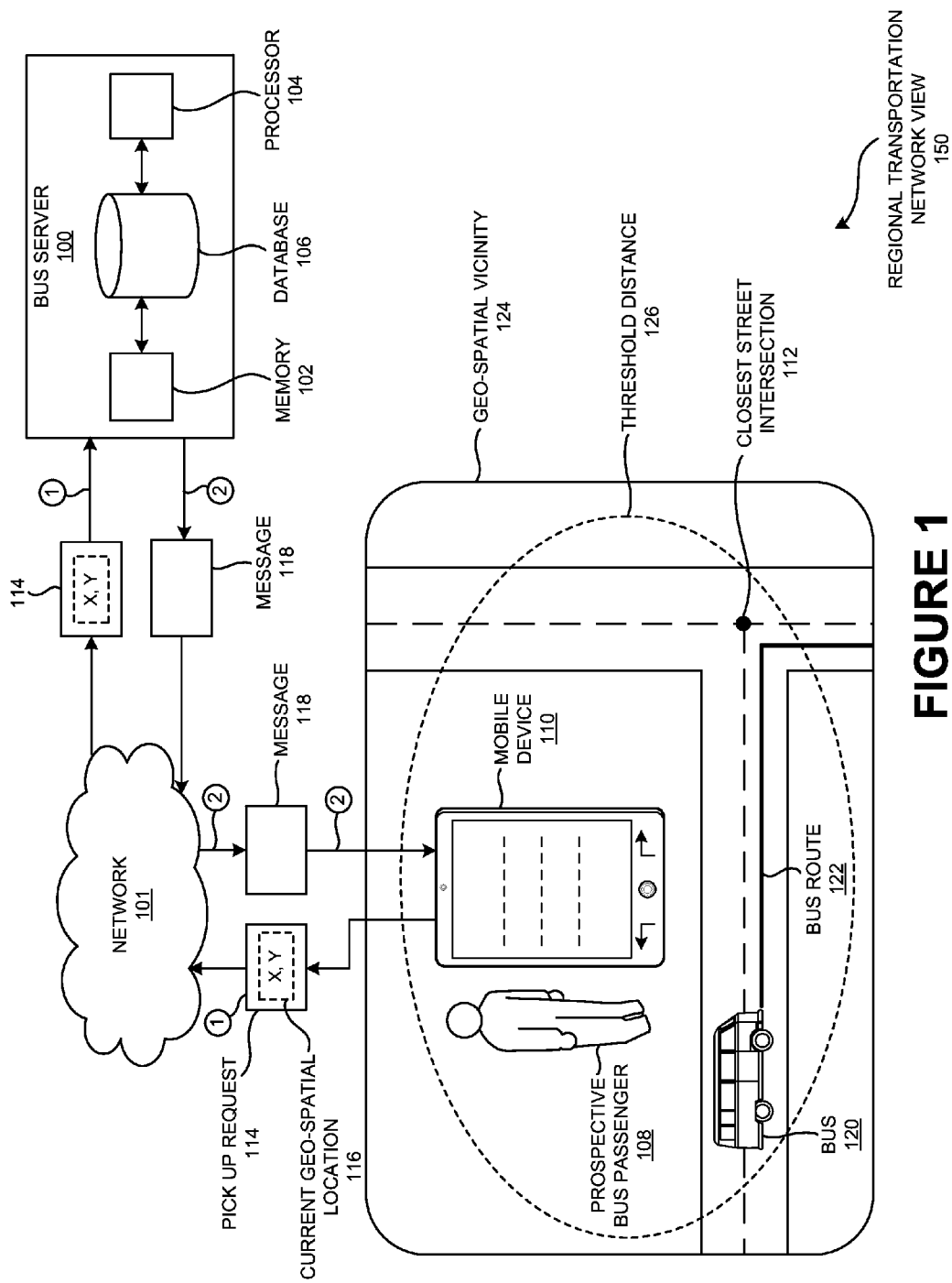
FIG. 1 is a regional transportation network view of a bus server receiving a pick-up request sent by a mobile device of a prospective bus passenger and communicating a message based on the pick-up request to the mobile device of the prospective bus passenger, according to one embodiment.

Disclosed are a method and system of variable bus stops across the bus route in a regional transportation network. FIG. 1 is a regional transportation network view 150 of a bus server receiving a pick-up request sent by a mobile device of a prospective bus passenger and communicating a message based on the pick-up request to the mobile device of the prospective bus passenger, according t6 one embodiment. In particular, FIG. 1 shows a bus server 100, a network 101, a memory 102, a processor 104, a database 106, a prospective bus passenger 108, a mobile device 110, a closest street intersection 112, a pick-up request 114, a current geo-spatial location 116, a message 118, a bus 120, a bus route 122, a geo-spatial vicinity 124, and a threshold distance 126.

FIG. 1 illustrates a number of operations between the bus server 100, the prospective bus passenger 108, and the bus 120. Particularly, circle '1' of FIG. 1 illustrates the pick-up request 114 being communicated from the mobile device 110 associated with the prospective bus passenger 108 to the bus server 100 through the network 101 (e.g., an Internet protocol network and/or a wide area network). The pick-up request 114 may include the current geo-spatial location 116 of the mobile device 110, a desired pick up time, a distance 308 desired to be traveled, a drop off location 306, and/or a desired bus fare 310. The mobile device 110 (e.g., a smartphone, a tablet, a laptop, a location service enabled portable device, and/or a personal planner) may communicate the pick-up request 114 through a network (e.g., the network 101 and/or a cellular network) using a browser application of the mobile device 110 (e.g., Google®, Chrome) and/or through a client-side application downloaded to the mobile device 110 (e.g., a Nextdoor.com mobile application, a Fatdoor.com mobile application). The prospective bus passenger 108 may be able to communicate the pick-up request 114 from any location (e.g., by indicating a future desired pick up location 302).

Circle '2' shows the message 118 being communicated by the bus server 100 to the mobile device 110 associated with the prospective bus passenger 108. The message 118 may be generated, using the processor 104 and the memory 102, based on the pick-up request 114 communicated by the prospective bus passenger 108. The bus server 100 may analyze the current location of the mobile device 110, associate the current geo-spatial location 116 of the mobile device 110 with the closest street intersection 112, determine if a bus route 122 traverses the closest street intersection 112, and/or instruct a bus 120 that traverses the bus route 122 to pick up the prospective passenger at the closest street intersection 112.

The message 118 may be communicated to the mobile device 110 through the network 101. In one embodiment, the message 118 may include the closest street intersection 112 (e.g., an address associated with the closest street intersection 112), the bus fare 310, the estimated time of arrival 304, walking direction from the current geo-spatial location 116 to the closest street intersection 112, and/or a unique identifier of the bus 120 that will pick up the prospective bus passenger 108 (e.g., a bus number). The bus server 100 may simultaneously communicate a set of instructions through the network 101 to the bus 120 (e.g., the bus associated with the bus route 122 that traverses the closest street intersection 112). The set of instructions may route the bus 120 to a safe stopping location 706 to make a pit stop 704 to pick up the prospective bus passenger 108. The bus 120 may be an autonomous vehicle and/or a semiautonomous vehicle.

In one embodiment, the bus server 100 may create shared ad-hoc bus stops by routing multiple prospective bus passengers 108 in the geo-spatial vicinity 124 (e.g., a current geo-spatial vicinity 124) of the prospective bus passenger 108 to a common intersection point (e.g., the closest street intersection 112) that is in the threshold distance 126 from each of the prospective bus passengers 108. The bus server 100 may determine if a threshold number of prospective bus passengers 108 are and/or will be at the shared ad-hoc bus stop before creating the shared ad-hoc bus stop and/or instructing the bus 120 to pick up passengers at the shared ad-hoc bus stop. Prospective bus passengers 108 may be able to request, through the pick-up request 114, a custom bus stop (e.g., the bus 120 will pick them up and/or drop them off at a requested location (e.g., the current geo-spatial location 116). In one embodiment, the prospective bus passenger 108 may be required to pay a premium 602 for a custom bus stop (e.g., a fee in addition to a bus fare 310 and/or a higher bus fare 310).

Figure 2:
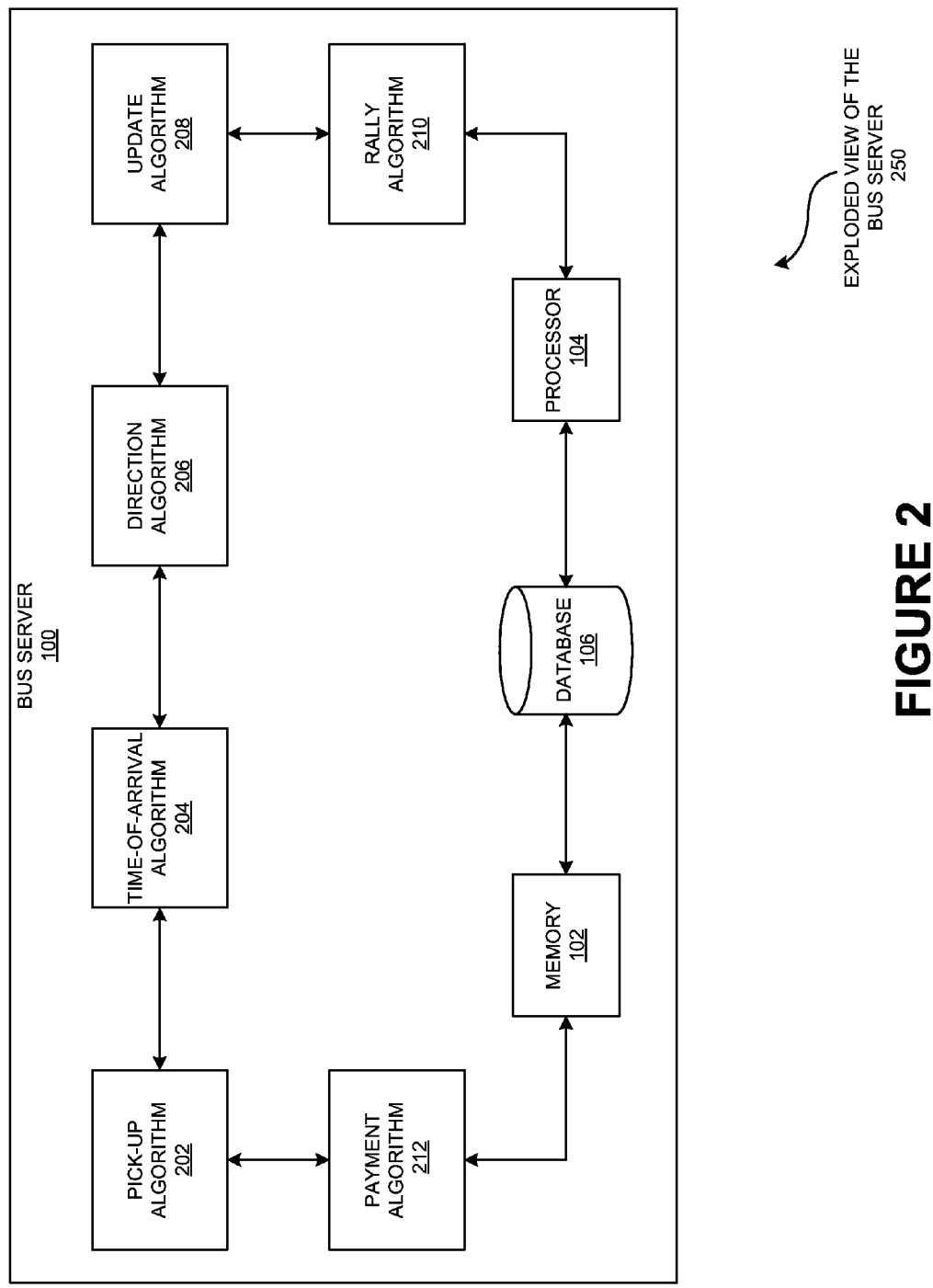
FIG. 2 is an exploded view of the bus server of FIG. 1, according to one embodiment.

FIG. 2 is an exploded view 250 of the bus server of FIG. 1, according to one embodiment. FIG. 2 shows a pick-up algorithm 202, a time-of-arrival algorithm 204, a direction algorithm 206, an update algorithm 208, a rally algorithm 210, and a payment algorithm 212.

The pick-up algorithm 202 may generate the set of instructions to route the bus 120 to the closest street intersection 112 and/or may instruct the bus 120 associated with the bus route 122 that traverses the closest street intersection 112 to pick up the prospective bus passenger(s) 108. In one embodiment, the pick-up algorithm 202 may instruct the bus 120 to only pick up (e.g., the doors only open for) certain prospective bus passengers 108 (e.g., prospective bus passengers 108 for whom the shared ad-hoc bus stop was created and/or prospective bus passengers 108 that sent the pick-up request 114 from which the set of instructions was generated).

The time-of-arrival algorithm 204 may communicate an estimated time of arrival 304 of the bus 120 to the mobile device 110 of the perspective bus 120 passenger through the message 118. In one embodiment, the time-of-arrival algorithm 204 may communicate a time until arrival to the prospective bus passenger 108 instead of or in addition to the time of arrival of the bus 120. The direction algorithm 206 may provide walking directions 604 to the prospective bus passenger 108. The walking directions 604 may be communicated as part of the message 118 and/or may direct the prospective bus passenger 108 from the current location of the mobile device 110 to the closest street intersection 112.

The update algorithm 208 may periodically ping the mobile device 110, providing updates to the prospective bus passenger 108 based on a request of the bus 120 passenger. The pickup updates may include progress of the bus 120 (e.g., a map through which the bus 120' progress may be viewed) and/or time remaining until the bus 120 arrives. In one embodiment, the pickup updates may be sent as text messages 118 and/or push notifications and/or may be communicated at predetermined intervals (e.g., intervals specified by the bus server 100 and/or the prospective passenger). The intervals may include time intervals, progress points of the bus 120 (e.g., when the bus 120 is a specified distance 308 and/or time away), and/or when the prospective bus passenger 108 requests the pickup update.

The rally algorithm 210 may route multiple prospective bus passengers 108 to a common intersection point (e.g., the shared ad-hoc bus stop and/or the closest street intersection 112). The common intersection point may be required to be in the threshold distance 126 from each of the multiple prospective bus passengers 108. The rally algorithm 210 may determine the common intersection point based on a threshold number of prospective bus passengers 108 that may be routed to the common intersection point, a most efficient location of the common intersection point, and/or a most efficient manner of establishing common intersection points (e.g., the manner that minimizes delays of a particular bus route 122).

The payment algorithm 212 may enable a payment (e.g., payment of the bus fare 310 and/or the premium 702) of the prospective bus passenger 108 to be processed. The prospective bus passenger 108 may make payment using the mobile device 110. The payment may be made in the pick-up request 114, in response to the message 118, and/or before the bus 120 is routed to pick up the prospective bus passenger 108. The bus fare 310 and/or premium 602 may be dependent upon the distance 308 desired to be traveled by the prospective bus passenger 108, the number of prospective bus passengers 108 to be picked up and/or dropped off at the pick-up location and/or drop-off location of the prospective bus passenger 108, and/or a size of the current and/or predicted demand placed on the bus server 100.

FIG. 3 is a table view 350 illustrating data relationships between the prospective bus passenger, the pick-up request, and the message of FIG. 1, according to one embodiment. FIG. 3 shows a pick up location 302, an estimated time of arrival 304, a drop off location 306, a distance 308, and a bus fare 310. In one embodiment, the pick-up request 114 may include the current geo-spatial location 116 (e.g., a set of geo-spatial coordinates). The pick-up request 114 may be associated with the mobile device 110 and/or the prospective bus passenger 108 associated with the mobile device 110 (e.g., the name of the prospective bus passenger 108, a profile of the prospective bus passenger 108, and/or the payment information of the prospective bus passenger 108).

The pick up location 302 may be an address (e.g., an address of a building located at the closest street intersection 112), a location name (e.g., the name of a building and/or a landmark at the closest street intersection 112 and/or a name of the closest street intersection 112 (e.g., $1^{st}$ and Main street)), and/or a set of geo-spatial coordinates. The estimated time of arrival 304 may be an estimated time of arrival 304. The estimated time of arrival 304 may be the time at which the bus 120 will arrive at the pick up location 302 provided the bus route 122 remains the same (e.g., no pit stops 704 are added) and/or the bus 120 continues at its current, scheduled, and/or predicted pace.

The estimated time of arrival 304 may be updated based on the addition of other pick up locations 302 and/or other pick-up requests 114 between the current location of the bus 120 and the pick up location 302. The updated estimated time of arrival 304 may be communicated to the prospective bus passenger 108 through pickup updates. In one embodiment, the bus server 100 may prioritize fidelity to estimated times of arrival 304 and/or pick up locations 302 that have already been communicated to prospective bus passengers 108. Additional pick-up requests 114 and/or additional pit stops 704 may not be accommodated if the bus server 100 determines that accommodation of the additional pick-up requests 114 and/or additional pit stops 704 would alter a threshold number of estimated times of arrival 304 and/or create a delay over a threshold amount. The prospective bus passenger 108 may be able to "prioritize" their pick up and/or estimated time of arrival 304, paying a premium 602 to have the bus 120 go directly to their pick up location 302 and/or to prevent the bus server 100 from delaying the estimated time of arrival 304 (e.g., preventing the bus server 100 from accommodating additional pick-up requests 114 between the current location of the bus 120 and the pick up location 302 of the prospective bus passenger 108 paying the premium 602).

The drop off location 306 may be a set of geo-spatial coordinates, a location name, and/or an address to which the prospective bus passenger 108 has requested to be taken. The distance 308 may be the distance 308 between the pick up location 302 and the drop off location 306 and/or the distance 308 the bus 120 will travel between the pick up location 302 and the drop off location 306. The bas fare may depend upon the distance 308, the nature of the pick up and/or drop off (e.g., whether the pick up location 302 and/or the drop off location 306 are custom bus stops, shared ad-hoc bus stops and/or scheduled bus stops), whether the pick up and/or drop off has been prioritized (e.g., by the prospective bus passenger 108 that requested the pick up and/or drop off), and/or a demand placed on the bus server 100 (e.g., whether the pick up and/or drop off associated with the bus fare 310 occurs at peak business hours).

Figure 4:
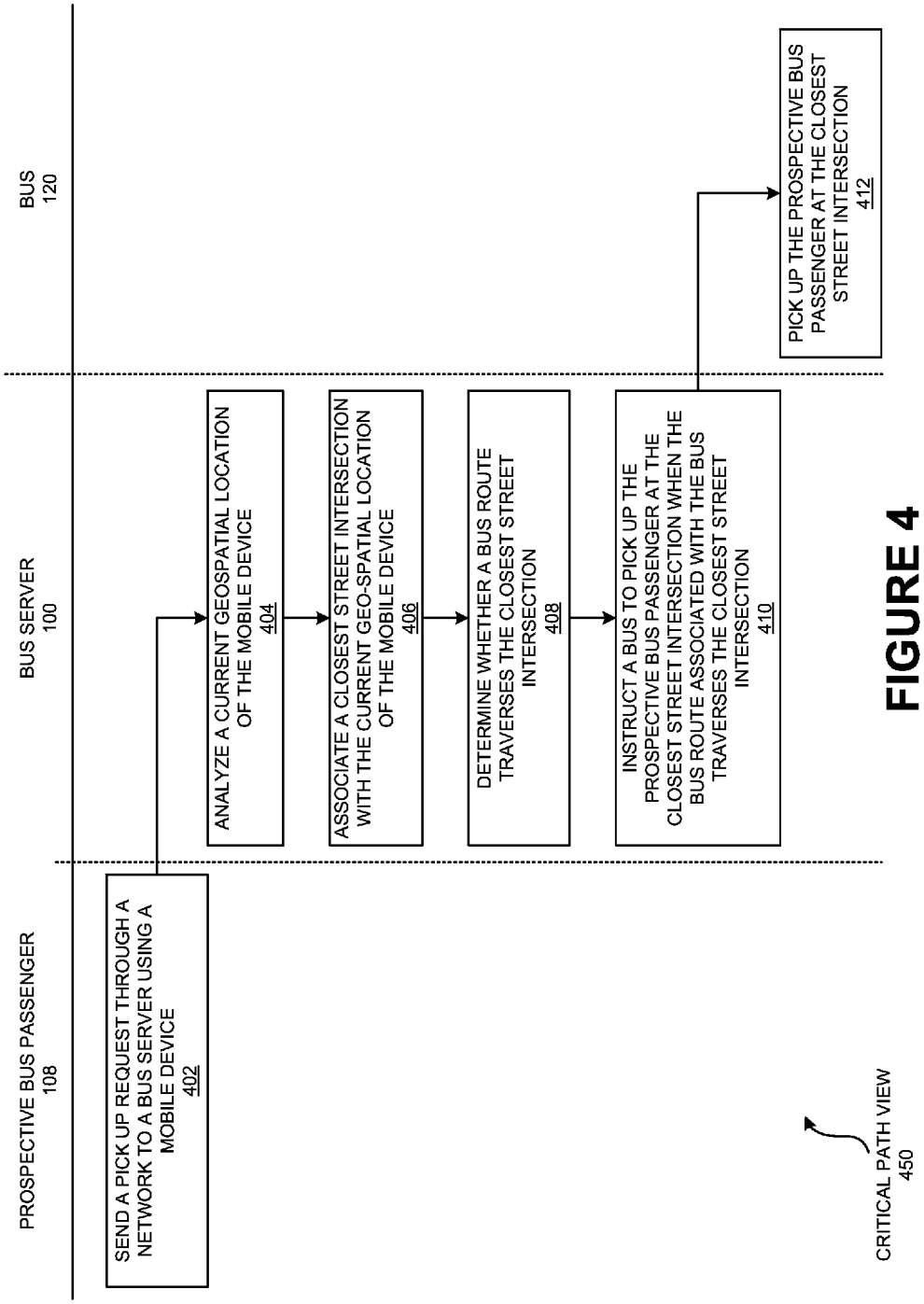
FIG. 4 is a critical path view illustrating a flow based on time where the prospective bus passenger with the mobile device sends pick-up request to the bus server of FIG. 1 and a message is communicated to the mobile device, according to one embodiment.

FIG. 4 is a critical path view 450 illustrating a flow based on time where the prospective bus passenger with the mobile device sends pick-up request to the bus server of FIG. 1 and a message is communicated to the mobile device, according to one embodiment.

In step 402, a prospective bus passenger 108 may send a pick-up request 114 through a network 101 to a bus server 100 using the mobile device 110. The bus server 100 may then analyze a current geo-spatial location 116 of the mobile device 110 (e.g., the current geo-spatial location 116 communicated in the pick-up request 114) in step 404. The bus server 100 may associate the current geo-spatial location 116 of the mobile device 110 with a closest street intersection 112 in step 406.

In step 408, the bus server 100 may determine whether a bus route 122 traverses the closest street intersection 112. In step 410, the bus server 100 may instruct a bus 120 (e.g., by communicating a set of instructions through the network 101) to pick up the prospective bus passenger 108 at the closest street intersection 112 when the bus route 122 associated with the bus 120 is determined to traverse the closest street intersection 112. The bus server 100 may only instruct the bus 120 to pick up the prospective bus passenger 108 when the prospective bus passenger 108 has made payment of the bus fare 310 and/or premium 602 associated with the pick-up request 114. In step 412, the bus 120 may pick up the prospective bus passenger 108 at the closest street intersection 112.

Figure 5:
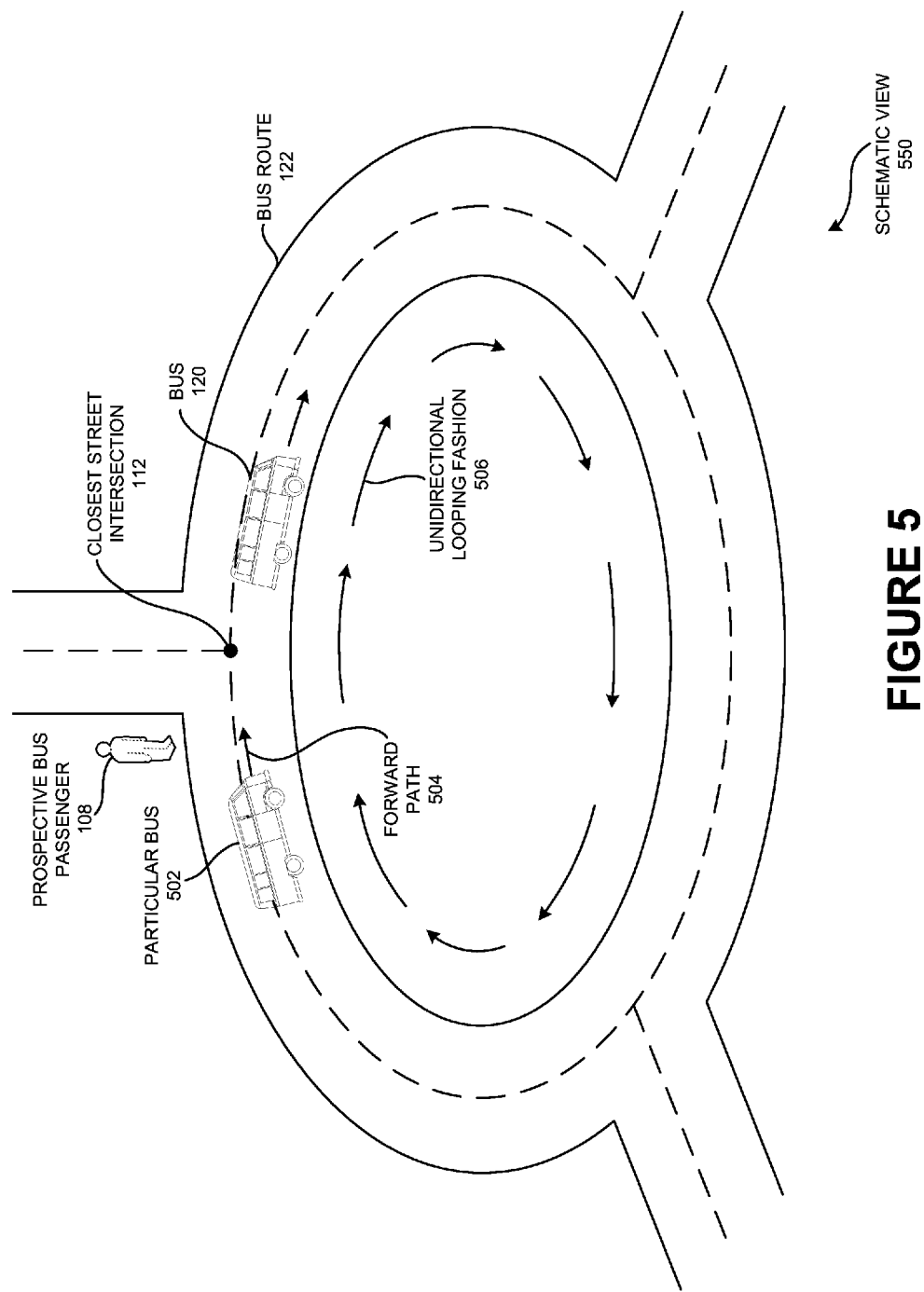
FIG. 5 is a schematic view of a unidirectional looping fashion of a bus route illustrating a forward path of a particular bus, according to one embodiment.

FIG. 5 is a schematic view 550 of a unidirectional looping fashion of a bus route illustrating a forward path of a particular bus, according to one embodiment. FIG. 5 shows a particular bus 502, a forward path 504, and unidirectional looping fashion 506ing fashion 506. In one embodiment, buses 120 may only travel in the unidirectional looping fashion 506 such that buses 120 may only make pickups and/or drop offs at locations (e.g., pit stops 704, safe parking locations, and/or closest street intersections 112) that are in the forward path 504.

In one embodiment, the bus server 100 may prefer the nearest bus 120 to which the closest street intersection 112 is in the forward path 504 as compared to other buses 120 that have departed from the closest street intersection 112. In the example embodiment of FIG. 5, the particular bus 502 may be preferred to pick up the prospective bus passenger 108 from the closest street intersection 112 over the bus 120. While the bus 120 may be physically closer to the closest street intersection 112, the bus 120 is shown to have departed from the closest street intersection 112 such that the closest street intersection 112 is no longer in the forward path 504 of the bus 120 (or such that the closest street intersection 112 is further away from the closest street intersection 112 along the forward path 504 than is the particular bus 502).

Figure 6A:
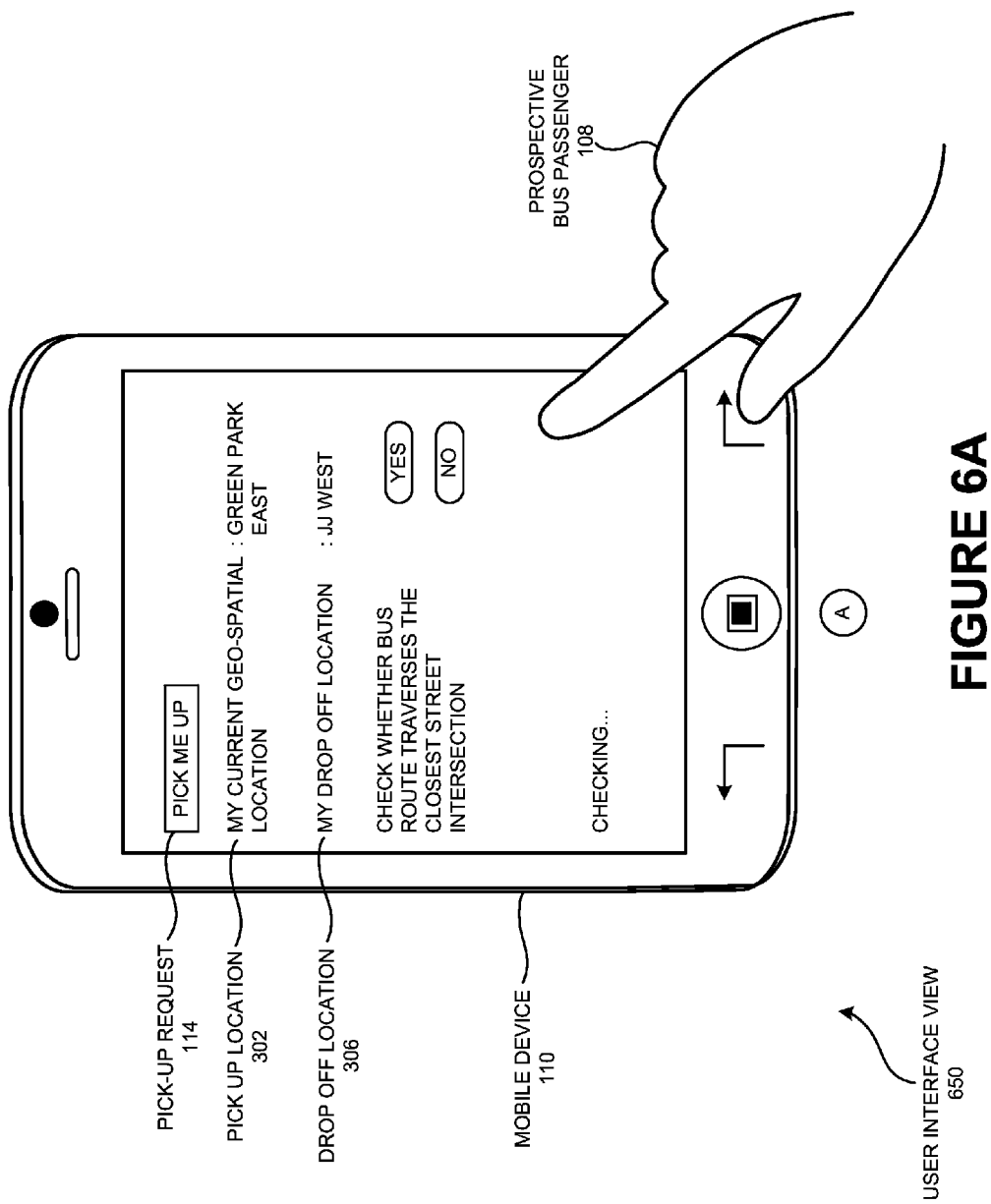
FIG. 6A is a user interface view displaying the pick-up request sent by the mobile device associated with the prospective bus passenger to the bus server of FIG. 1, according to one embodiment.

FIG. 6A is a user interface view 650 displaying the pick-up request 114 sent by the mobile device 110 associated with the prospective bus passenger 108 to the bus server 100 of FIG. 1, according to one embodiment. In user interface A, the prospective bus passenger 108 may be able to set their pick up location 302 (e.g., a custom bus stop and/or the current geo-spatial location 116 of the mobile device 110). The user may be able to enter an intersection, an address, and/or place a pin on a map view to indicate the requested pick up location 302. The prospective bus passenger 108 may be able to select the desired drop off location 306 through similar means.

The bus server 100 may automatically determine whether a bus 120 traverses the closes street intersection and/or requested pick up location 302 and/or the prospective bus passenger 108 may query the server after inputting information on the mobile device 110. The pick-up request 114 may include a desired bus fare 310 range, a desired bus fare 310, a desired time of pick up, a desired time of drop off, and/or a desired ride duration time. In one embodiment, the prospective bus passenger 108 may be required to sign onto their profile (e.g., on Fatdoor.com) in order to submit the pick-up request 114.

Figure 6B:
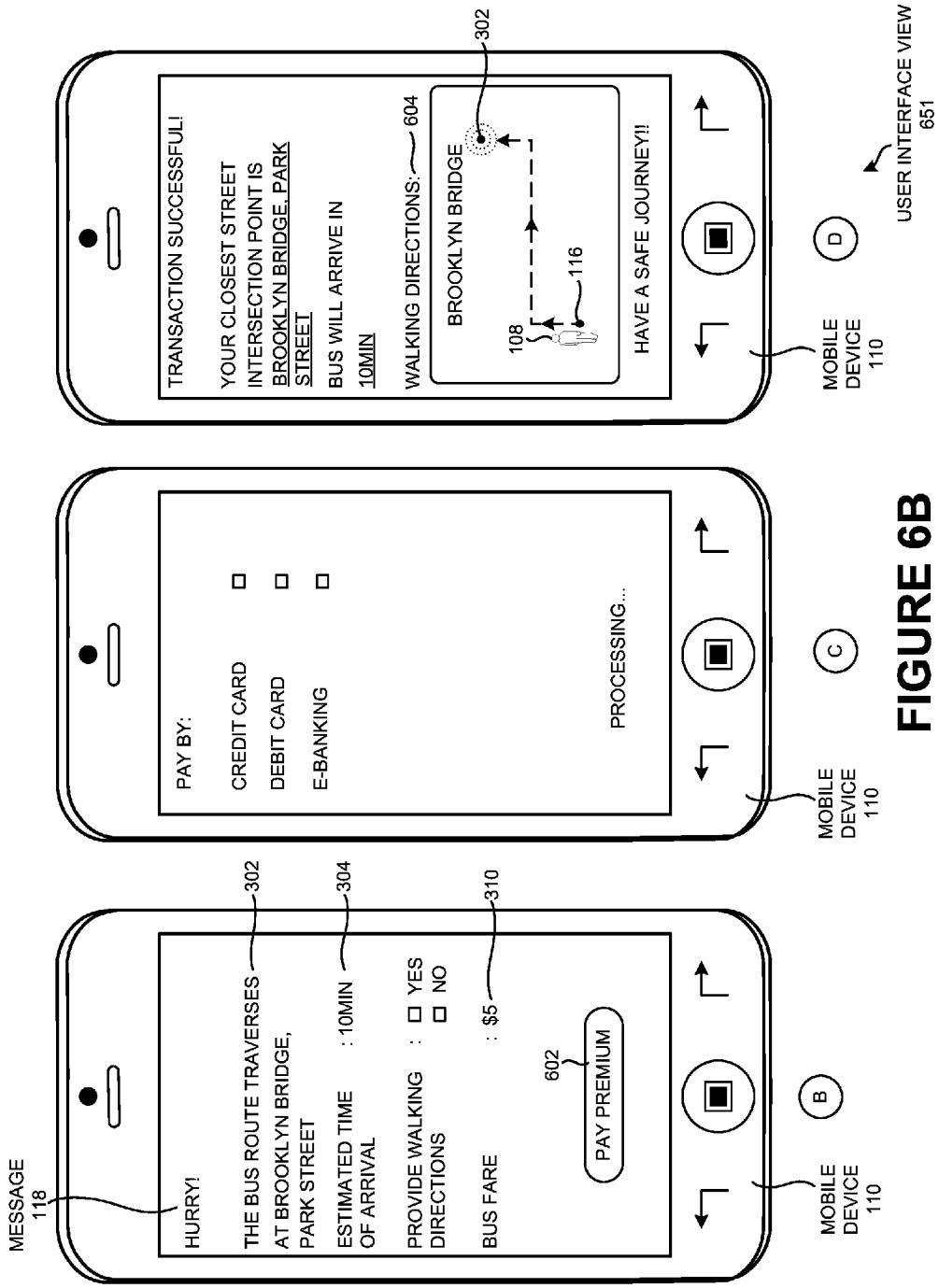
FIG. 6B is a user interface view displaying a message sent by the bus server to the mobile device associated with the prospective bus passenger of FIG. 1, according to one embodiment.

FIG. 6B is a user interface view 651 displaying a message sent by the bus server to the mobile device associated with the prospective bus passenger of FIG. 1, according to one embodiment. In user interface B, the prospective bus passenger 108 may be able to view whether a bus 120 traverses the closes street intersection and/or requested pick up location 302. The mobile device 110 may display the unique identifier of the bus 120 (e.g., the bus number), the associated closest street intersection 112, the estimated time of arrival 304, the bus fare 310, the premium 602 (if applicable), and/or the walking directions 604. The prospective bus passenger 108 may be able to pay the bus fare 310 and/or premium 602 and/or contact an operator through the user interface B.

User interface C may enable the prospective user to select a payment method and/or complete the payment using the mobile device 110. The prospective user may be able to select and/or enter a credit card (e.g., a credit card for which the user has previously provided information (e.g., card number, expiration date, and/or security code), a debit card, and/or an e-banking method (e.g., account transfer, PayPal®, and/or Venmo®). User interface D may enable the prospective user to view and/or use walking directions 604 from the current geo-spatial location 116 of the mobile device 110 to the requested pick up location 302 (e.g., the closest street intersection 112). The bus 120 may be instructed to pick the prospective bus passenger 108 up at the pick up location 302 once payment has been made and/or the prospective bus passenger 108 has confirmed the ride.

FIG. 7 is a graphical process flow 750 of variable bus stops across the bus route in a regional transportation network, according to one embodiment. Particularly, FIG. 7 shows a reader 702, a pit stop 704, and a safe stopping location 706. In circle '1,' the prospective bus passenger 108 may communicate the pick-up request 114 to the bus server 100. In one embodiment, the pick-up request 114 may include a comment from the prospective bus passenger 108 (e.g., that the prospective bus passenger 108 has a bicycle with them and/or requires a seat due to age and/or disability).

The bus server 100 may generate the message 118 based on the pick-up request 114 and/or communicate the message 118 to the mobile device 110 in circle '2.' The prospective bus passenger 108 may indicate the desired drop off location 306 using the mobile device 110 in circle '3.' In one embodiment, the prospective bus passenger 108 may indicate the desired drop off location 306 in the pick-up request 114.

In circle '4,' the prospective bus passenger 108 may pay the bus fare 310 and/or premium 702 using the mobile device 110. The bus 120 may be routed to the closest street intersection 112 and/or the pick up location 302 to pick up the prospective bus passenger 108 in circle '5.' In circle '6,' the bus 120 may continue along the forward path 504 on the unidirectional looping fashion 506 to the closest street intersection 112.

The bus 120 may make a pit stop 704 at the safe stopping location 706 to pick up the prospective bus passenger 108. The prospective bus passenger 108 may swipe the mobile device 110 on the reader 702 of the bus 120 (e.g., the particular bus 502) in circle '7.' In circle '8,' the doors of the bus 120 may open in response to the mobile device 110 being swiped on the reader 702. In one embodiment, the reader 702 may sense a signal sent from the mobile device 110 and/or a code (e.g., a QR code and/or a bar code) sent to the mobile device 110 from the bus server 100. The bus 120 door may only open for prospective bus passengers 108 whom have paid the bus fare 310 and/or premium 702. The safe stopping location 706 may be a designated area (e.g., a bus stop) and/or may be a sensed location that the bus 120 has determined to be a safe stopping location 706 (e.g., using an optical sensor, a laser sensor, a radar sensor, and/or an ultrasound sensor).

Figure 8:
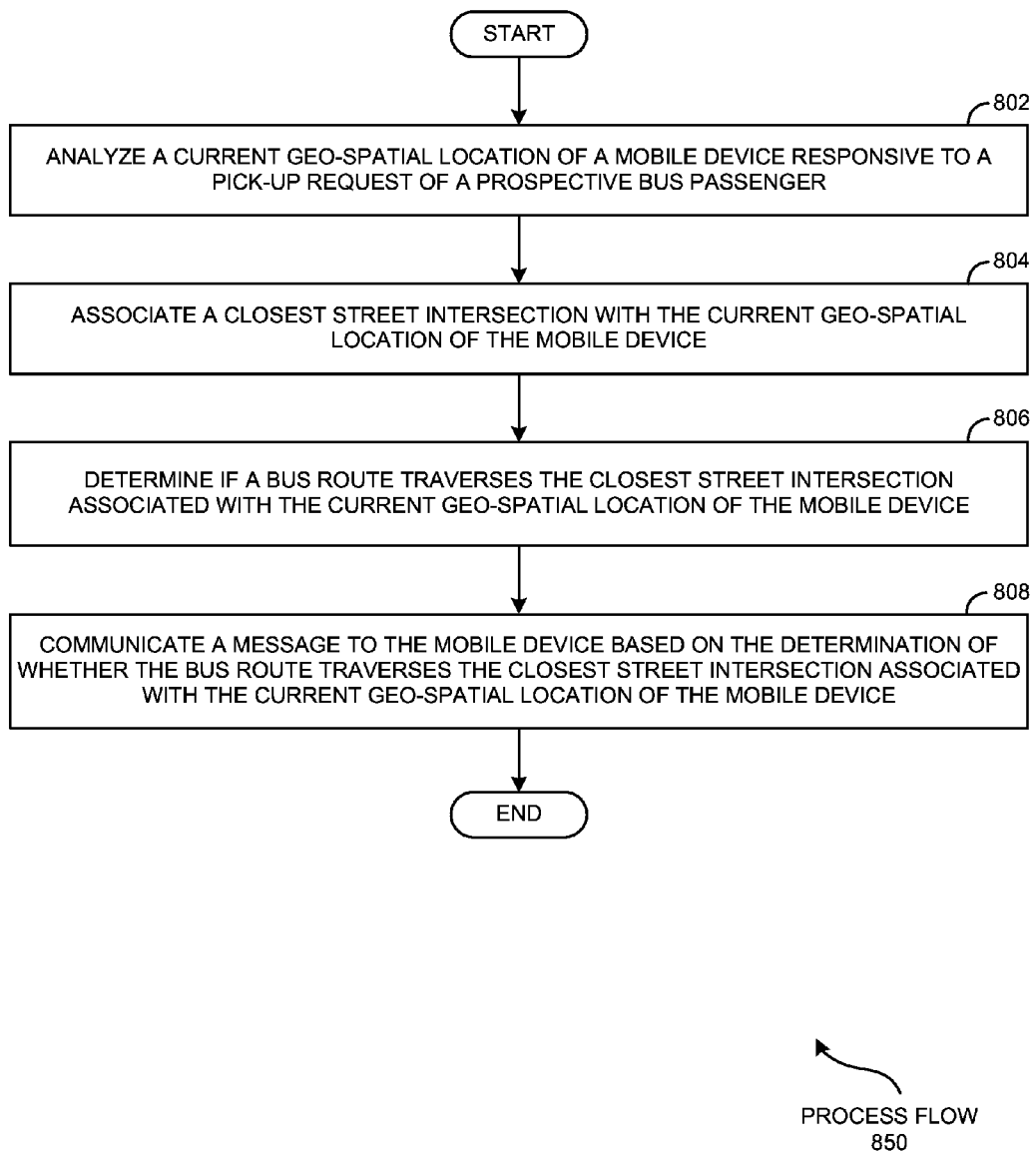
FIG. 8 is a process flow detailing the operations involving variable bus stops across the bus route in a regional transportation network of FIG. 1, according to one embodiment.

FIG. 8 is a process flow 850 detailing the operations involving variable bus stops across the bus route in a regional transportation network of FIG. 1, according to one embodiment. Operation 802 may analyze a current geo-spatial location 116 of a mobile device 110 responsive to a pick-up request 114 of a prospective bus passenger 108. Operation 804 may associate a closest street intersection 112 with the current geo-spatial location 116 of the mobile device 110. Operation 806 may determine if a bus route 122 traverses the closest street intersection 112 associated with the current geo-spatial location 116 of the mobile device 110. Operation 808 may communicate a message 118 to the mobile device 110 based on the determination of whether the bus route 122 traverses the closest street intersection 112 associated with the current geo-spatial location 116 of the mobile device 110.

Disclosed are a method and system of variable bus stops across a bus route in a regional transportation network, according to one embodiment. In one embodiment, a method of a bus server 100 includes analyzing a current geo-spatial location 116 of a mobile device 110 responsive to a pick-up request 114 of a prospective bus passenger 108, associating a closest street intersection 112 with the current geo-spatial location 116 of the mobile device 110, and determining if a bus route 122 traverses the closest street intersection 112 associated with the current geo-spatial location 116 of the mobile device 110. A message 118 may be communicated to the mobile device 110 based on the determination of whether the bus route 122 traverses the closest street intersection 112 associated with the current geo-spatial location 116 of the mobile device 110.

A bus 120 associated with the bus route 122 may be instructed to pick up the prospective bus passenger 108 at the closest street intersection 112 on the bus route 122 when the bus route 122 traverses the closest street intersection 112 associated with the current geo-spatial location 116 of the mobile device 110. An estimated time of arrival 304 of the bus 120 may be communicated to the prospective bus passenger 108 through the message 118. The bus 120 may only traverse the bus route 122 in a unidirectional looping fashion 506ing fashion 506 (such that a particular bus 502 on the bus route 122 for which the closest street intersection 112 is in a forward path 504 of the particular bus 502 is closest is preferred, as compared to other buses 120 on the bus route 122 that have already departed from the closest street intersection 112 in forward journey on the bus route 122). The particular bus 502 may be an autonomously navigating vehicle and/or a semiautonomously navigating vehicle.

Walking directions 604 may be provided to the prospective bus passenger 108 to the closest street intersection 112 on the bus route 122. The mobile device 110 may be periodically pinged to provide pickup updates to the prospective bus passenger 108 based on a request of the prospective bus passenger 108. Multiple ones of the prospective bus passengers 108 in a neighborhood of a current geo-spatial vicinity 124 of the prospective bus passenger 108 may be routed to a common intersection point that is within a threshold distance 126 from each of the prospective bus passengers 108 of the neighborhood to minimize delays of the particular bus 502 on the bus route 122. The closest street intersection 112 may be associated with an address that provides for safe navigation of the particular bus 502 on the bus route 122, such that the particular bus 502 is able to make a pit stop 704 at a safe stopping location 706 when picking up the prospective bus passenger 108.

A bus fare 310 associated with a route of the bus 120 may be settled directly on the mobile device 110 of the prospective bus passenger 108 prior to the prospective bus passenger 108 boarding the bus 120. The bus fare 310 may be dependent upon a distance 308 desired to be travelled by the prospective bus passenger 108. The prospective bus passenger 108 may select a drop off location 306 using the mobile device 110. The drop off location 306 may be a scheduled bus stop, a custom bus stop, and/or a shared ad-hoc bus stop with other current and prospective bus passengers 108 on the bus route 122. The prospective bus passenger 108 may pay a premium 702 when the prospective bus passenger 108 selects the custom bus stop on the bus route 122. The particular bus 502 may be routed to the closest street intersection 112 only when the bus fare 310 is paid on the mobile device 110. The particular bus 502 may open a door of the bus 120 when the prospective bus passenger 108 swipes the mobile device 110 on a reader 702 of the particular bus 502 when the bus fare 310 has been paid with the mobile device 110 by the prospective bus passenger 108.

In another embodiment, a method of a bus 120 sever includes analyzing a current geo-spatial location 116 of a mobile device 110 responsive to a pick-up request 114 of a prospective bus passenger 108, associating a closest street intersection 112 with the current geo-spatial location 116 of the mobile device 110, and determining if a bus route 122 traverses the closest street intersection 112 associated with the current geo-spatial location 116 of the mobile device 110. The method also includes instructing a bus 120 associated with the bus route 122 to pick up the prospective bus passenger 108 at the closest street intersection 112 on the bus route 122 when the bus route 122 traverses the closest street intersection 112 associated with the current geo-spatial location 116 of the mobile device 110. A message 118 may be communicated to the mobile device 110 based on the determination of whether the bus route 122 traverses the closest street intersection 112 associated with the current geo-spatial location 116 of the mobile device 110.

In yet another embodiment, a system includes a mobile device 110 having a current geo-spatial location 116, a network 101, and a bus server 100. The bus server 100 is configured to analyze the current geo-spatial location 116 of the mobile device 110 responsive to a pick-up request 114 of a prospective bus passenger 108, associate a closest street intersection 112 with the current geo-spatial location 116 of the mobile device 110, determine if a bus route 122 traverses the closest street intersection 112 associated with the current geo-spatial location 116 of the mobile device 110, and communicate, through the network 101, a message 118 to the mobile device 110 based on the determination of whether the bus route 122 traverses the closest street intersection 112 associated with the current geo-spatial location 116 of the mobile device 110.

A pick-up algorithm 202 may instruct a bus 120 associated with the bus route 122 to pick up the prospective bus passenger 108 at the closest street intersection 112 on the bus route 122 when the bus route 122 traverses the closest street intersection 112 associated with the current geo-spatial location 116 of the mobile device 110. A time-of-arrival algorithm 204 may communicate an estimated time of arrival 304 of the bus 120 to the prospective bus passenger 108 through the message 118. The bus 120 may only traverse the bus route 122 in a unidirectional looping fashion 506ing fashion 506 (such that a particular bus 502 on the bus route 122 for which the closest street intersection 112 is in a forward path 504 of the particular bus 502 is closest is preferred, as compared to other buses 120 on the bus route 122 that have already departed from the closest street intersection 112 in forward journey on the bus route 122). The particular bus 502 may be an autonomously navigating vehicle, and/or a semiautonomously navigating vehicle.

A direction algorithm 206 may provide walking directions 604 to the prospective bus passenger 108 to the closest street intersection 112 on the bus route 122. An update algorithm 208 may periodically ping the mobile device 110 to provide pickup updates to the prospective bus passenger 108 based on a request of the prospective bus passenger 108. A rally algorithm 210 may route multiple ones of the prospective bus passengers 108 in a neighborhood of a current geo-spatial vicinity 124 of the prospective bus passenger 108 to a common intersection point that is within a threshold distance 126 from each of the prospective bus passengers 108 of the neighborhood to minimize delays of the particular bus 502 on the bus route 122.

The closest street intersection 112 may be associated with an address that provides for safe navigation of the particular bus 502 on the bus route 122 (such that the particular bus 502 is able to make a pit stop 704 at a safe stopping location 706 when picking up the prospective bus passenger 108). A payment algorithm 212 may directly settle a bus fare 310 associated with a route of the bus 120 on the mobile device 110 of the prospective bus passenger 108 prior to the prospective bus passenger 108 boarding the bus 120. The bus fare 310 may be dependent upon a distance 308 desired to be travelled by the prospective bus passenger 108.

The prospective bus passenger 108 may select a drop off location 306 using the mobile device 110. The drop off location 306 may be a scheduled bus stop, a custom bus stop, and/or a shared ad-hoc bus stop with other current and prospective bus passengers 108 on the bus route 122. The prospective bus passenger 108 may pay a premium 702 when the prospective bus passenger 108 selects the custom bus stop on the bus route 122. The particular bus 502 may be routed to the closest street intersection 112 only when the bus fare 310 is paid on the mobile device 110. The particular bus 502 may open a door of the bus 120 when the prospective bus passenger 108 swipes the mobile device 110 on a reader 702 of the particular bus 502 when the bus fare 310 has been paid with the mobile device 110 by the prospective bus passenger 108.

An example embodiment will now be described. In one example embodiment, Jane may not have access to a car and/or may live in an area that makes use of a personal vehicle unnecessary (e.g., a metropolitan city center). She may rely on public transportation to get to and/or from work. Jane may live a long distance away from a standard bus stop and/or may not have time to wait at a location for a bus 120 that is often delayed and/or full.

Jane may be able to use her smart phone to request a pick up. She may receive a message 118 informing her that bus 2 is able to pick her up at the corner one block from her apartment in 10 minutes. Jane may be able to pay the bus fare 310 using her smart phone and/or quickly and easily get to work using the bus 120. In one embodiment, Jane may be in a hurry and/or request the bus 120 drop her off right outside of her office. Jane may be able to pay a premium 702 for the custom bus stop and/or get to work on time.

In another example embodiment, Jon may be visiting a new city. He may not want to take a taxi in order to save money. He may not know the bus 120 lines in the city and/or may not want to spend time studying bus 120 loops and/or determining which bus 120 and/or bus stop he should use. Jon may send a pick-up request 114 using his mobile device 110. He may request to be taken from a popular tourist attraction to a museum.

There may be several other prospective bus passengers 108 requesting pickups around Jon's location (e.g., other people leaving the popular tourist attraction). Jon may be directed to a shared ad-hoc bus stop along with other perspective bus 120 passengers. He may be picked up very close to the tourist attraction. Several passengers on the bus 120 may be going to the same museum as Jon and/or the bus 120 may drop Jon (along with the other passengers) off right outside of the museum. By using the regional transportation network, Jon may be able to get convenient bus 120 rides in a new city without having to travel long distances to find bus stops and/or become knowledgeable of the city's bus system.

Although the present embodiments have been described with reference to specific example embodiments, it will be evident that various modifications and changes may be made to these embodiments without departing from the broader spirit and scope of the various embodiments. For example, the various devices, algorithms, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of a bus server, comprising:
analyzing a current geospatial location of a mobile device responsive to a pick up request of a prospective bus passenger;
associating a closest street intersection with the current geospatial location of the mobile device;
determining if a bus route traverses the closest street intersection associated with the current geospatial location of the mobile device;
communicating a message to the mobile device based on the determination of whether the bus route traverses the closest street intersection associated with the current geospatial location of the mobile device,
wherein a bus fare associated with a route of the bus is settled directly on the mobile device of the prospective bus passenger prior to the prospective bus passenger boarding
a bus associated with the bus route to pick up the prospective bus passenger at the closest street intersection on the bus route,
wherein the bus fare is dependent upon a distance desired to be travelled by the prospective bus passenger,
wherein the prospective bus passenger to select a drop off location using the mobile device,
wherein the drop off location is at least one of a scheduled bus stop, a custom bus stop, and a shared ad-hoc bus stop with other current and prospective bus passengers on the bus route,
wherein the prospective bus passenger to pay a premium when the prospective bus passenger selects the custom bus stop on the bus route,
wherein a particular bus to be routed to the closest street intersection only when the bus fare is paid on the mobile device, and
wherein the particular bus to open a door of the bus when the prospective bus passenger swipes the mobile device on a reader of the particular bus when the bus fare has been paid with the mobile device by the prospective bus passenger.

2. The method of the bus server of claim 1, further comprising:
instructing the bus associated with the bus route to pick up the prospective bus passenger at the closest street intersection on the bus route,
wherein the bus route traverses the closest street intersection associated with the current geospatial location of the mobile device; and
communicating an estimated time of arrival of the bus to the prospective bus passenger through the message.

3. The method of the bus server of claim 2:
wherein the bus only traverses the bus route in a unidirectional looping fashion such that the particular bus on the bus route for which the closest street intersection is in a forward path of the particular bus is closest is preferred, as compared to other buses on the bus route that have already departed from the closest street intersection in forward journey on the bus route, and
wherein the particular bus is at least one of an autonomously navigating vehicle, and a semiautonomously navigating vehicle.

4. The method of the bus server of claim 3 further comprising:
providing walking directions to the prospective bus passenger to the closest street intersection on the bus route.

5. The method of the bus server of claim 4, further comprising:
periodically pinging the mobile device to provide pickup updates to the prospective bus passenger based on a request of the prospective bus passenger; and
routing multiple ones of the prospective bus passengers in a neighborhood of a current geospatial vicinity of the prospective bus passenger to a common intersection point that is within a threshold distance from each of the prospective bus passengers of the neighborhood to minimize delays of the particular bus on the bus route.

6. The method of the bus server of claim 5:
wherein the closest street intersection is associated with an address that provides for safe navigation of the particular bus on the bus route, such that the particular bus is able to make a pit stop at a safe stopping location when picking up the prospective bus passenger.

7. A method of a bus sever, comprising:
analyzing a current geospatial location of a mobile device responsive to a pick up request of a prospective bus passenger;
associating a closest street intersection with the current geospatial location of the mobile device;
determining if a bus route traverses the closest street intersection associated with the current geospatial location of the mobile device;
instructing a bus associated with the bus route to pick up the prospective bus passenger at the closest street intersection on the bus route,
wherein when the bus route traverses the closest street intersection associated with the current geospatial location of the mobile device,
wherein a bus fare associated with the bus route is settled directly on the mobile device of the prospective bus passenger prior to the prospective bus passenger boarding the bus,
wherein the bus fare is dependent upon a distance desired to be travelled by the prospective bus passenger,
wherein the prospective bus passenger to select a drop off location using the mobile device, wherein the drop off location is at least one of a scheduled bus stop, a custom bus stop, and a shared ad-hoc bus stop with other current and prospective bus passengers on the bus route, wherein the prospective bus passenger to pay a premium when the prospective bus passenger selects the custom bus stop on the bus route, wherein a particular bus to be routed to the closest street intersection only when the bus fare is paid on the mobile device, and wherein the particular bus to open a door of the bus when the prospective bus passenger swipes the mobile device on a reader of the particular bus when the bus fare has been paid with the mobile device by the prospective bus passenger.

8. The method of the bus server of claim 7 further comprising:

communicating a message to the mobile device based on the determination of whether the bus route traverses the closest street intersection associated with the current geospatial location of the mobile device; and communicating an estimated time of arrival of the bus to the prospective bus passenger through the message.

9. The method of the bus server of claim 8:

wherein the bus only traverses the bus route in a unidirectional looping fashion such that the particular bus on the bus route for which the closest street intersection is in a forward path of the particular bus is closest is preferred, as compared to other buses on the bus route that have already departed from the closest street intersection in forward journey on the bus route, and wherein the particular bus is at least one of an autonomously navigating vehicle, and a semiautonomously navigating vehicle.

10. The method of the bus server of claim 9 further comprising:

providing walking directions to the prospective bus passenger to the closest street intersection on the bus route.

11. The method of the bus server of claim 10 further comprising:

periodically pinging the mobile device to provide pickup updates to the prospective bus passenger based on a request of the prospective bus passenger; and routing multiple ones of the prospective bus passengers in a neighborhood of a current geospatial vicinity of the prospective bus passenger to a common intersection point that is within a threshold distance from each of the prospective bus passengers of the neighborhood to minimize delays of the particular bus on the bus route.

12. The method of the bus server of claim 11:

wherein the closest street intersection is associated with an address that provides for safe navigation of the particular bus on the bus route, such that the particular bus is able to make a pit stop at a safe stopping location when picking up the prospective bus passenger.

13. A system comprising:

a mobile device having a current geospatial location;

a network; and a bus server configured to:

analyze the current geospatial location of the mobile device responsive to a pick up request of a prospective bus passenger, associate a closest street intersection with the current geospatial location of the mobile device, determine if a bus route traverses the closest street intersection associated with the current geospatial location of the mobile device, communicate, through the network, a message to the mobile device based on the determination of whether the bus route traverses the closest street intersection associated with the current geospatial location of the mobile device, a payment algorithm to directly settle a bus fare associated with the bus route on the mobile device of the prospective bus passenger prior to the prospective bus passenger boarding a bus associated with the bus route to pick up the prospective bus passenger at the closest street intersection on the bus route, wherein the bus fare is dependent upon a distance desired to be travelled by the prospective bus passenger, wherein the prospective bus passenger to select a drop off location using the mobile device, wherein the drop off location is at least one of a scheduled bus stop, a custom bus stop, and a shared ad-hoc bus stop with other current and prospective bus passengers on the bus route, wherein the prospective bus passenger to pay a premium when the prospective bus passenger selects the custom bus stop on the bus route, wherein a particular bus to be routed to the closest street intersection only when the bus fare is paid on the mobile device, and wherein the particular bus to open a door of the bus when the prospective bus passenger swipes the mobile device on a reader of the particular bus when the bus fare has been paid with the mobile device by the prospective bus passenger.

14. The system of claim 13, further comprising:

a pick-up algorithm to instruct the bus associated with the bus route to pick up the prospective bus passenger at the closest street intersection on the bus route, wherein when the bus route traverses the closest street intersection associated with the current geospatial location of the mobile device; and a time-of-arrival algorithm to communicate an estimated time of arrival of the bus to the prospective bus passenger through the message.

15. The system of claim 14:

wherein the bus only traverses the bus route in a unidirectional looping fashion such that the particular bus on the bus route for which the closest street intersection is in a forward path of the particular bus is closest is preferred, as compared to other buses on the bus route that have already departed from the closest street intersection in forward journey on the bus route, and wherein the particular bus is at least one of an autonomously navigating vehicle, and a semiautonomously navigating vehicle.

16. The system of claim 15 further comprising:

a direction algorithm to provide walking directions to the prospective bus passenger to the closest street intersection on the bus route;

an update algorithm to periodically ping the mobile device to provide pickup updates to the prospective bus passenger based on a request of the prospective bus passenger; and a rally algorithm to route multiple ones of the prospective bus passengers in a neighborhood of a current geospatial vicinity of the prospective bus passenger to a common intersection point that is within a threshold distance from each of the prospective bus passengers of the neighborhood to minimize delays of the particular bus on the bus route.

17. The system of claim 16:
wherein the closest street intersection is associated with an address that provides for safe navigation of the particular bus on the bus route, such that the particular bus is able to make a pit stop at a safe stopping location when picking up the prospective bus passenger.

* * * * *